United States Patent
Hattori et al.

(10) Patent No.: US 8,305,860 B2
(45) Date of Patent: Nov. 6, 2012

(54) INFORMATION PROCESSING DEVICE, INFORMATION PROCESSING METHOD, AND PROGRAM

(75) Inventors: Shinobu Hattori, Tokyo (JP); Kazuo Yamamoto, Chiba (JP); Motoki Kato, Kanagawa (JP); Yoshiyuki Kobayashi, Tokyo (JP); Kenjiro Ueda, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/171,700

(22) Filed: Jun. 29, 2011

(65) Prior Publication Data

US 2012/0008480 A1    Jan. 12, 2012

(30) Foreign Application Priority Data

Jul. 8, 2010   (JP) ................................ P2010-155698

(51) Int. Cl.
*G11B 7/00* (2006.01)
(52) U.S. Cl. ......................................................... 369/84
(58) Field of Classification Search .................... 369/84, 369/85, 47.1, 47.27, 275.3
See application file for complete search history.

(56) References Cited

U.S. PATENT DOCUMENTS 7,782,941 B2    8/2010  Suzuki et al.
8,086,331 B2 *  12/2011 Ikeda et al. ..................... 700/94

FOREIGN PATENT DOCUMENTS

JP    2008-098765 A    4/2008
JP    2010-011511 A    1/2010

* cited by examiner

*Primary Examiner* — Nabil Hindi
(74) *Attorney, Agent, or Firm* — Lerner, David, Littenberg, Krumholz & Mentlik, LLP

(57) ABSTRACT

An information processing device including a data processing section which executes control of a copying process where recording data on a first medium is recorded onto a second medium, and a data conversion section which executes data conversion in the copying process, where the data processing section acquires position information of a packet, which corresponds to an angle change point, based on conversion data generated by the data conversion section and executes an updating process on a reproduction control information file where angle change point position information of data before conversion which is recorded in the reproduction control information file included in copy target data is changed to angle change point position information of data after conversion.

10 Claims, 32 Drawing Sheets

FIG. 2

| INDEX | CONTENT MANAGEMENT UNIT (CPS) | UNIT KEY (CPS UNIT KEY) |
|---|---|---|
| TITLE 1 | CPS1 | Ku1 |
| TITLE 2 | CPS2 | Ku2 |
| TITLE 3 | CPS3 | Ku3 |
| ⋮ | ⋮ | ⋮ |
| TITLE n | CPSn | Kun |

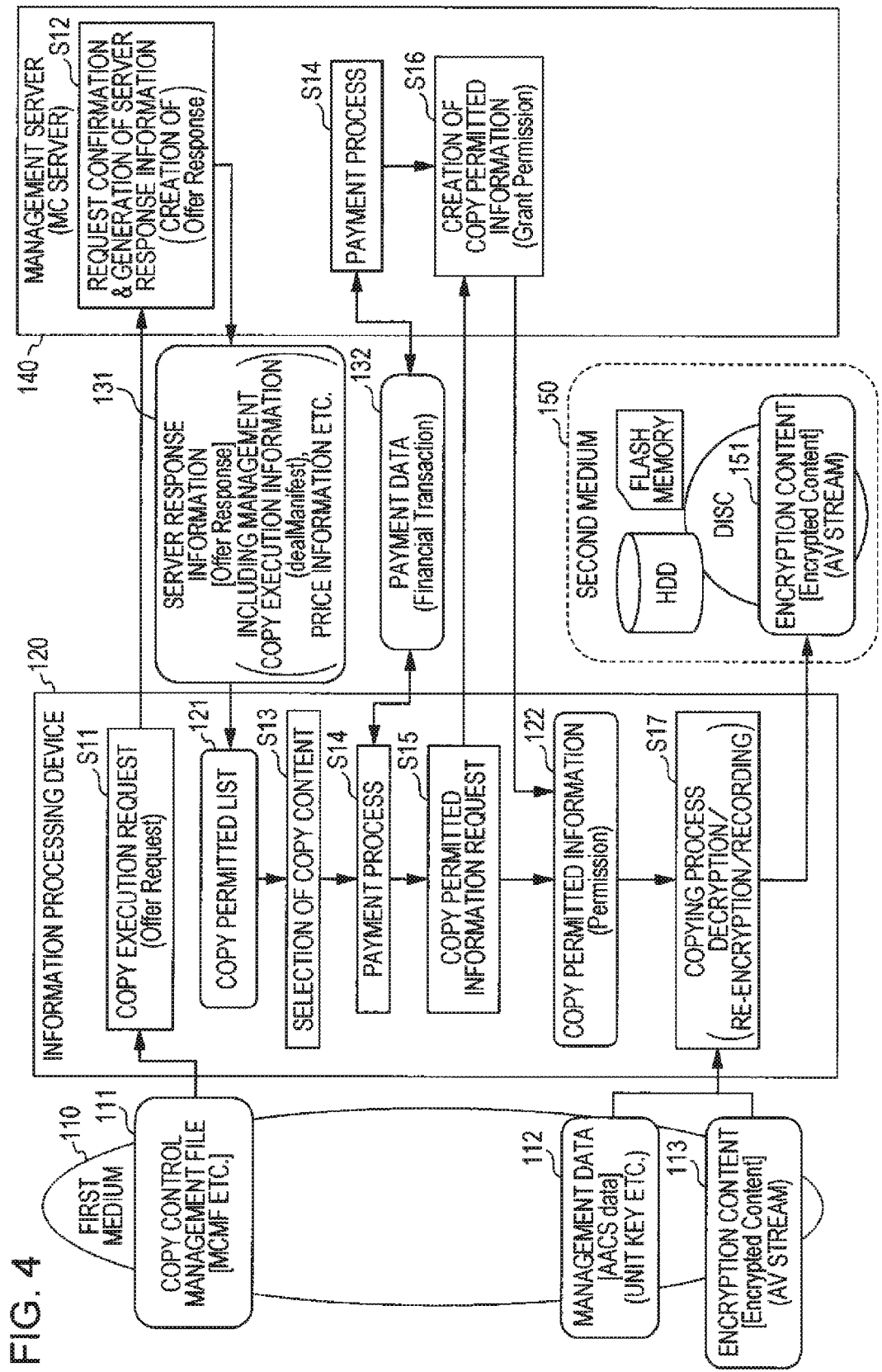

FIG. 5

| ELEMENT (Element) | | | CONTENT (Note) |
|---|---|---|---|
| MANAGEMENT SERVER URL (URL of MCS) | | | URL OF MANAGEMENT SERVER TO BE ACCESSED |
| COPY DATA INFORMATION (File name to be copied) | NAME OF PLAY LIST FILE (PlayList file name) | | NAME OF PLAY LIST FILE WHICH IS COPY TARGET (ABLE TO SPECIFY CLIP BASED ON PLAY LIST) |
| | CPS UNIT KEY INFORMATION (Index to identify the CPS Unit Key) | | ENCRYPTION KEY APPLIED IN DECRYPTION PROCESS |
| | COPY UNIT IDENTIFIER (MCUI) | | INFORMATION IDENTIFYING COPY UNIT AS MC (Managed Copy) EXECUTION SEGMENT |
| CONTENT ID (Content ID) | | | CONTENT IDENTIFIER |

FIG. 6

| ELEMENT (Element) | CONTENT (Note) |
|---|---|
| CONTENT ID (Content ID) | CONTENT IDENTIFIER |
| CONTENT CERTIFICATE ID (Content Certificate ID) | IDENTIFIER OF CONTENT CERTIFICATE |
| MEDIUM IDENTIFIER (Pre-recorded Media Serial Number) | UNIQUE MEDIUM IDENTIFIER |
| RANDOM NUMBER (mcmNonce) | DATA VALIDITY CONFIRMATION DATA |
| LANGUAGE CODE (Language Code) | USED FOR DETERMINING DISPLAY LANGUAGE ETC. OF PLAY LIST ETC. |

FIG. 7

| ELEMENT (Element) | | CONTENT (Note) |
|---|---|---|
| OFFER DETAIL INFORMATION (offer) | TITLE/ABSTRACT/DESCRIPTION (title/abstract/description) | IDENTIFYING INFORMATION OF CONTENT WHERE COPYING IS PERMITTED (To identify content by MCS) |
| | COPY UNIT IDENTIFIER (MCUi) | IDENTIFYING INFORMATION OF COPY UNIT AS COPY SEGMENT (To identify Managed Copy Unit (item for sale)) |
| | PRICE INFORMATION / PRICE AUXILIARY INFORMATION (price/priceInfo) | COPY PRICE INFORMATION (priceInfo is a additional information regarding price (e.g. remaining copy count)) |
| | SERIAL NUMBER (serialNumberRequired) | SERIAL NUMBER WHICH SETS SERVER (To indicate if sticker code input is required or not) |
| | PAYMENT SERVER URL (financialHTMLURL) | PAYMENT SERVER ACCESS INFORMATION (URL of financial server (may be different from MCS)) |
| | COPY DESTINATION INFORMATION (mcotInfo) | INFORMATION ON DEVICE WHICH IS COPY DESTINATION AND MEDIUM (Information regarding copy destination) |
| RANDOM NUMBER (mcmNonce) | | DATA FOR CONFIRMATION OF DATA VALIDITY (To compare with mcmNonce which MCM sent) |
| COPY DATA INFORMATION [File name to be copied] (dealManifest) | NAME OF PLAY LIST FILE (PlayList file name) | SPECIFYING INFORMATION OF FILE WHICH IS COPY PROCESSING TARGET (To identify Clip AV stream(s) and Clip Information) |
| | CPS UNIT KEY INFORMATION (Index to identify the CPS Unit Key) | KEY INFORMATION FOR CONTENT DECRYPTION (To decrypt Clip AV stream(s)) |
| | COPY UNIT IDENTIFIER (MCUi) | IDENTIFYING INFORMATION OF COPY UNIT AS COPY SEGMENT (To identify Managed Copy Unit (item for sale)) |
| SERVER PUBLIC KEY CERTIFICATE (MCScert) | | PUBLIC KEY CERTIFICATE WHICH STORES PUBLIC KEY OF MANAGEMENT SERVER (Including MCS public key) |
| SIGNATURE (signature) | | DATA FOR DATA VALIDITY CONFIRMATION (To verify integrity of offer) |

FIG. 13

| Syntax | No. of bits | Mnemonic |
|---|---|---|
| PlayList() { | | |
|   length | 32 | uimsbf |
|   reserved_for_future_use | 16 | bslbf |
|   number_of_PlayItems | 16 | uimsbf |
|   number_of_SubPaths | 16 | uimsbf |
|   for (PlayItem_id=0;<br>    PlayItem_id<number_of_PlayItems;<br>    PlayItem_id++) { | | |
|     PlayItem() | | |
|   } | | |
|   for (SubPath_id=0;<br>    SubPath_id<number_of_SubPaths;<br>    SubPath_id++) { | | |
|     SubPath() | | |
|   } | | |
| } | | |

| Syntax | No. of bits | Mnemonic |
|---|---|---|
| PlayItem() { | | |
|   length | 16 | uimsbf |
|   Clip_Information_file_name | 8*5 | bslbf |
|   Clip_codec_identifier | 8*4 | bslbf |
|   reserved_for_future_use | 8 | bslbf |
|   ... | ... | ... |
|   is_seamless_multi_angle==1 | 1 | bslbf |
|   ... | ... | ... |
|   if(is_seamless_multi_angle==1) | | |
|   multi clip entries | | |
|   number of angles | | |
|   ... | ... | ... |
|   STN_table() | | |
| } | | |

211 { is_seamless_multi_angle==1

212 { if(is_seamless_multi_angle==1), multi clip entries, number of angles

FIG. 15

| Syntax | No. of bits | Mnemonic |
|---|---|---|
| zzzzz.clpi { | | |
|     type_indicator | 8*4 | bslbf |
|     version_number | 8*4 | bslbf |
|     SequenceInfo_start_address | 32 | uimsbf |
|     ProgramInfo_start_address | 32 | uimsbf |
|     CPI_start_address | 32 | uimsbf |
|     ClipMark_start_address | 32 | uimsbf |
|     MakersPrivateData_start_address | 32 | uimsbf |
|     reserved_for_future_use | 96 | bslbf |
|     ClipInfo() | | |
|     for(i=0; i<N1; i++){ | | |
|         padding_word | 16 | bslbf |
|     } | | |
|     SequenceInfo() | | |
|     for(i=0; i<N2; i++){ | | |
|         padding_word | 16 | bslbf |
|     } | | |
|     ProgramInfo() | | |
|     for(i=0; i<N3; i++){ | | |
|         padding_word | 16 | bslbf |
|     } | | |
|     CPI() | | |
|     for(i=0; i<N4; i++){ | | |
|         padding_word | 16 | bslbf |
|     } | | |
|     ClipMark() | | |
|     for(i=0; i<N5; i++){ | | |
|         padding_word | 16 | bslbf |
|     } | | |
|     MakersPrivateData() | | |
|     for(i=0; i<N6; i++){ | | |
|         padding_word | 16 | bslbf |
|     } | | |
| } | | |

- 221: ClipInfo()
- 222: SequenceInfo()
- 223: ProgramInfo()
- 224: CPI()
- 225: ClipMark()
- 226: MakersPrivateData()

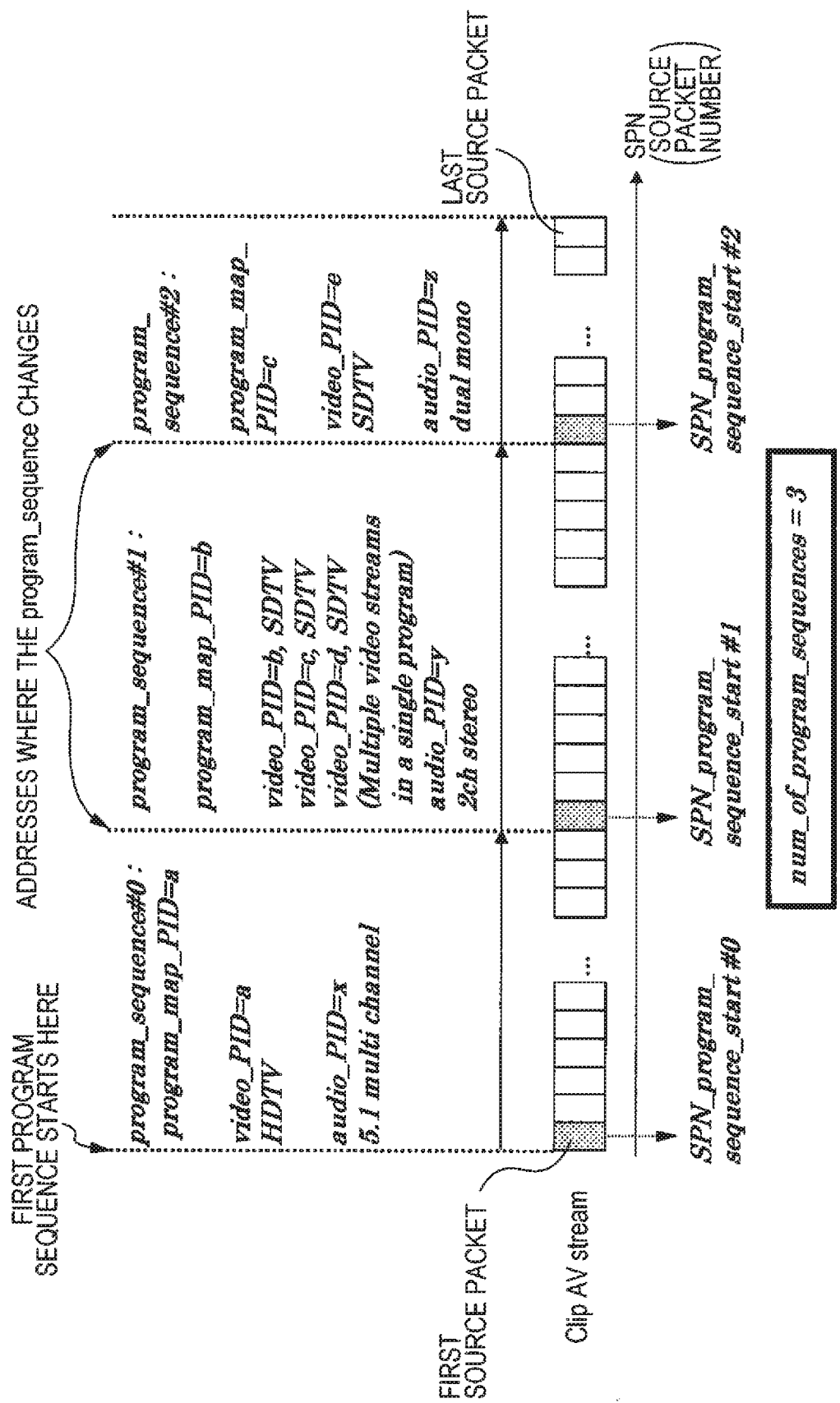

FIG. 17

| Syntax | No. of bits | Mnemonic |
|---|---|---|
| ProgramInfo() { | | |
|     length | 32 | uimsbf |
|     reserved_for_word_align | 8 | bslbf |
|     num_of_program_sequences | 8 | uimsbf |
|     for(i=0; i<num_of_program_sequences; i++){ | | |
|         SPN_program_sequence_start[i] | 32 | uimsbf |
|         program_map_PID[i] | 16 | bslbf |
|         num_of_streams_in_ps[i] | 8 | uimsbf |
|         num_of_groups[i] | 8 | uimsbf |
|         for (stream_index=0;<br>            stream_index < num_of_streams_in_ps[i];<br>            stream_index++) { | | |
|             stream_PID[i][stream_index] | 16 | uimsbf |
|             StreamCodingInfo(i, stream_index) | | |
|         } | | |
|         if (num_of_groups[i] > 1) { | | |
|             for(j=0; j<num_of_groups[i]; j++) { | | |
|                 num_of_streams_in_group[i][j] | 8 | uimsbf |
|                 for (k=0; k<num_of_streams_in_group[i][j];k++) { | | |
|                     ref_to_stream_index[i][j][k] | 8 | uimsbf |
|                 } | | |
|                 if (num_of_streams_in_group[i][j]%2==0) { | | |
|                     reserved_for_word_align | 8 | bslbf |
|                 } | | |
|             } | | |
|         } | | |
|     } | | |
| } | | |

FIG. 18

| Syntax | No. of bits | Mnemonic |
|---|---|---|
| CPI() { | | |
|   length | 32 | uimsbf |
|   reserved_for_word_align | 12 | bslbf |
|   CPI_type | 4 | uimsbf |
|   if (CPI_type == 1) { | | |
|     EP_map() | | |
|   } else if (CPI_type == 2) { | | |
|     TU_map() | | |
|   } | | |
| } | | |

230

FIG. 30
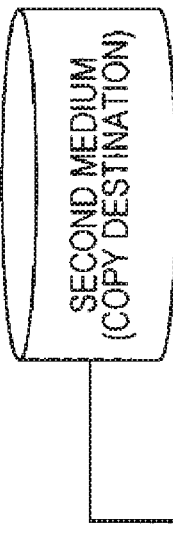
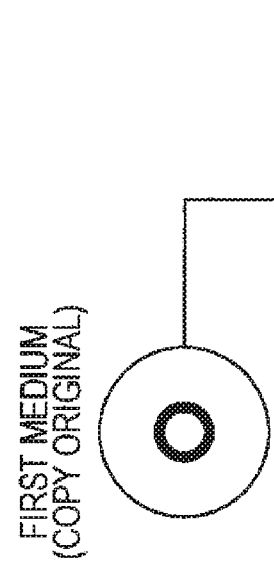

INFORMATION PROCESSING DEVICE, INFORMATION PROCESSING METHOD, AND PROGRAM

CROSS-REFERENCE TO RELATED APPLICATION

The present application claims priority from Japanese Patent Application No. JP 2010-155698 filed in the Japanese Patent Office on Jul. 8, 2010, the entire content of which is incorporated herein by reference.

The present disclosure contains subject matter related to that disclosed in Japanese Priority Patent Application JP 2010-155698 filed in the Japan Patent Office on Jul. 8, 2010, the entire contents of which are hereby incorporated by reference.

BACKGROUND OF THE INVENTION

The present disclosure relates to an information processing device, an information processing method, and a program. In further detail, the present disclosure relates to an information processing device, an information processing method, and a program which performs a process of executing a predetermined data conversion, generating conversion copy data, and recording onto a second medium at a time of copy processing of data which is recorded on a medium (information recording medium) such as a disc.

In recent years, DVDs (Digital Versatile Discs), BDs (Blu-ray Discs (registered trademark)), and the like are often used as information recording media for a variety of content such as movies, music, and the like. Creators, distributors, or the like of much of the content, such as music data and image data, which is recorded on the information recording media, have copyrights or distribution rights. Accordingly, there are certain limitations in the use of the content recorded on the disc even for the user which has purchased the disc. For example, performing of unlimited copying of the content recorded on the disc to media such as other discs is not permitted.

As a copy management configuration of content stored on a medium in this manner, a management configuration (MC: Managed Copy) is known where copying is permitted subject to copy permitted information being received from a management server. A detailed sequence of managed copying (MC) is as below.

A medium such as a disc which stores content is mounted into a user device such as a PC, a recording reproduction device, or the like and the user device connects to a management server via a network.

After that, the user device sends information prescribed in advance such as a disc identifier (ID) to the server.

After confirming the validity of the information received and the like, the server sends the copy permitted information to the user device.

The user device starts a copying process subject to the reception of the copy permitted information from the server.

The copying process of content stored on a disc with regard to other media is permitted using a sequence in this manner.

The copy management configuration is referred to as Managed Copying and the details are disclosed in, for example, Japanese Unexamined Patent Application Publication No. 2008-98765.

On the other hand, there is an AACS (Advanced Access Content System) standard as a standard relating to content copyright protection technology. Much of the content stored on discs such as BDs in accordance with the AACS standard is recorded as encrypted content. As a representative encryption configuration of the AACS standard, there is a configuration where the content is partitioned into unit segments and encryption keys which differ for each unit are applied. By adopting an encryption configuration such as this, it is possible to control use of the unit segments of the content and various controls of the use of the content are strictly realized.

The unit which is a partition unit of the content is referred to as a CPS unit, and the encryption key which is applied to the encryption process and the decryption process of each of the CPS units is referred to as a CPS unit key, a unit key, or a title key.

In the user device such as that described above, in a case where copying of content stored on a medium, such as a BD (Blu-ray Disc (registered trademark)) where a movie or the like which is subject to copyright management is stored, is performed to another medium, for example, such as a hard disk, a flash memory, or another disc, copy permitted information is received from the management server and copying is executed in accordance with the Managed Copy described above.

However, if the content which is stored on a medium such as a BD (Blu-ray Disc (registered trademark)) is copied one after the other to, for example, a hard disk (HDD) which is a medium for copying, the amount of spare capacity on the hard disk which has a limited capacity is reduced and it is not possible to record large amounts of content.

As one method of solving a problem such as this, at a time of a copying process, there is a method of performing compression encoding of the copy data, generating video data or audio data with a higher compression rate, and recording in a copy destination. Alternatively, it is possible to reduce the amount of data by using a process for lowering the bit rate or selecting and copying only images, sounds, subtitles, or the like which is the minimum data necessary without performing copying of all data.

The processing of performing compression encoding and generating video data or audio data with a higher compression rate is performed by, for example, a transcoder which performs conversion of encoded data. For example, the transcoder performs a process of converting MPEG-2 encoded data stored in the original copying medium to AVCHD encoded data or MPEG4-AVC encoded data, changing of the compression rate, and removal of specific stream (second audio stream or the like). The AVCHD or MPEG4-AVC encoded data generated by the transcoder is recorded on a medium for copying (for example, a hard disk or the like).

Here, as a technology in the related art which describes the data conversion process, for example, there is Japanese Unexamined Patent Application Publication No. 2010-11511.

However, when data conversion is performed in this manner, there are cases where data format or control information of the data before conversion is lost or changed. As a result, there are cases where it is not possible to perform reproduction of the copy data, which is recorded on the medium for copying as conversion data, in the same manner as the reproduction of the original data.

As a specific example where a problem such as this occurs, for example, there is multi-angle content which includes captured images from a plurality of angles and where it is possible to switch and display the angle according to an input from a user. In a case where the multi-angle content is copied, there is a problem where there is a loss of or a change in information which is necessary for angle changing due to the data conversion executed at a time of a copying process and it is not possible to normally perform angle changing even when the copy data after conversion is reproduced.

SUMMARY OF THE INVENTION

It is desirable to provide an information processing device, an information processing method, and a program where it is possible to execute data conversion with regard to content which, for example, is recorded on a first medium such as a BD or the like, and in a configuration of copying to a second medium, to execute data conversion while maintaining various reproduction forms of the original copy data and reproduce the copy data after conversion in the same manner as the original data.

In a case where the copy content is, for example, multi-angle content, it is desirable to provide an information processing device, an information processing method, and a program which realize data conversion where angle changing is possible in the same manner as the original data even in a case where the copy content after data conversion is reproduced from the medium for copying.

An information processing device according to a first embodiment of the disclosure has a data processing section which executes control of a copying process where recording data on a first medium is recorded onto a second medium and a data conversion section which executes data conversion in the copying process, where the data processing section acquires position information of a packet, which corresponds to an angle change point, based on conversion data generated by the data conversion section and executes an updating process on a reproduction control information file where angle change point position information of data before conversion which is recorded in the reproduction control information file included in copy target data is changed to angle change point position information of data after conversion.

Furthermore, in the information processing device according to the first embodiment of the disclosure, the data processing section is a configuration where a rewriting process of a source packet number (SPN), which is registration information of an EP map included in a clip information file which is the reproduction control information file, is executed, and executes a process where a source packet number (SPN) which corresponds to the packet position of the angle change point of the data before conversion is changed to a source packet number (SPN) which corresponds to the packet position of the angle change point of the data after conversion.

Furthermore, in the information processing device according to the first embodiment of the disclosure, in regard to correspondence data of a presentation time stamp (PTS) which is reproduction time information registered in the EP map and a source packet number (SPN), the data processing section performs a process where the presentation time stamp (PTS) is not changed and the source packet number (SPN) is changed according to the configuration of the data after conversion.

Furthermore, in the information processing device according to the first embodiment of the disclosure, the data processing section is calculated the source packet number (SPN) which corresponds to the packet position of the angle change point of the data after conversion based on the number of packets or the number of bits from the head of the stream data after conversion.

Furthermore, in the information processing device according to the first embodiment of the disclosure, in regard to correspondence data of a presentation time stamp (PTS) which is reproduction time information registered in the EP map and a source packet number (SPN), the data processing section performs a process where the source packet number (SPN) is changed according to the configuration of the data after conversion irrespective of whether or not it is the angle change point.

Furthermore, in the information processing device according to the first embodiment of the disclosure, the data conversion section generates conversion data which is able to be decoded at least without referencing a preceding picture in a case where a picture which is the reproduction start position of the angle change point is reproduced as a reproduction start point.

Furthermore, in the information processing device according to the first embodiment of the disclosure, the data conversion section executes a data conversion process which includes at least a process of any of encoding method conversion, compression rate conversion, and stream removal.

Furthermore, in the information processing device according to the first embodiment of the disclosure, the information processing device further includes a communication section which executes communication with a management server, and the data processing section displays a list of copy permitted data which includes recording data on the first medium based on received information from the management server and selects copy target data based on user designation with regard to display information.

Furthermore, an information processing method, which is executed in an information processing device, according to a second embodiment of the disclosure includes executing control of a copying process where recording data on a first medium is recorded onto a second medium using a data processing section and executing data conversion in the copying process using a data conversion section, where, in the executing of control of the copying process, position information of a packet which corresponds to an angle change point is acquired based on conversion data generated by the data conversion section and an updating process on a reproduction control information file, where angle change point position information of data before conversion which is recorded in the reproduction control information file included in copy target data is changed to angle change point position information of data after conversion, is executed.

Furthermore, a program, which executes information processing in an information processing device, according to a third embodiment of the disclosure includes executing control of a copying process where recording data on a first medium is recorded onto a second medium using a data processing section and executing data conversion in the copying process using a data conversion section, where, in the executing of control of the copying process, position information of a packet which corresponds to an angle change point is acquired based on conversion data generated by the data conversion section and an updating process on a reproduction control information file, where angle change point position information of data before conversion which is recorded in the reproduction control information file included in copy target data is changed to angle change point position information of data after conversion, is executed.

Here, the program according to the embodiment of the disclosure is, for example, a program which is able to be provided using a storage medium, which is provided in a format which is computer readable, or using a communication medium with regard to an information processing device or a computer system which is able to execute various program codes. By providing a program such as this in a format which is computer readable, the process is realized according to the program in the information processing system or the computer system.

Further aims, characteristics, and advantages of the disclosure will be made clear using more detailed description based on the embodiments of the disclosure and the attached drawing described later. Here, the system in the specifications is a logical group structure of a plurality of devices and is not limited to the devices of each configuration being in the same housing.

According to the embodiments of the disclosure, in the copying process of content, a device and a method are provided which made it possible to execute reproduction of copy content from a specified position with any problems even in a case where a packet configuration is changed in accordance with data conversion. The information processing device according to the embodiment of the disclosure acquires the position information of the packet which corresponds to the angle change point at a time of data conversion which accompanies the copying process and changes the angle change point position information of the data before conversion, which is recorded in the reproduction control information file included in the copy target data, to the position information of the data after conversion. Specifically, a process is executed where the source packet number (SPN), which is included in the registration data of the EP map included in the clip information file which is the reproduction control information file, is changed to the source packet number (SPN) which corresponds to the packet position of the angle change point of the data after conversion. Using the EP map updating process, correct angle changing reproduction using EP map registration information is possible in a reproduction process of the copy content.

BRIEF DESCRIPTION OF THE DRAWINGS

FIG. 2 is a diagram describing a unit configuration and a unit key management table;

FIG. 4 is a diagram describing a sequence of a copying process (MC (Managed Copy) using management of a management server;

FIG. 5 is a diagram describing configuration data of a copy control management file (MCMF: Managed Copy Manifest File) which is recording information of a first medium;

FIG. 6 is a diagram illustrating one example of data included in a copy execution request;

FIG. 7 is a diagram describing basic information included in server response information (Offer Response);

FIG. 13 is a diagram describing syntax (data structure) of a play list file;

FIG. 14 is a diagram describing syntax (data structure) of play item information in a play list file;

FIG. 15 is a diagram describing syntax (data structure) of a clip information file;

FIG. 16 is a diagram describing PrpgramInfo of a clip information file;

FIG. 17 is a diagram describing syntax (data structure) of PrpgramInfo of a clip information file;

FIG. 18 is a diagram describing syntax (data structure) of CPI (Characteristic Point Information) of a clip information file;

FIG. 30 is a diagram illustrating an updating process example of a play list file;

DETAILED DESCRIPTION OF EMBODIMENTS

Below, details of an information processing device, an information processing method, and a program according to embodiments of the disclosure will be described with reference to the diagrams. Here, the description will be performed in accordance with the items below.

1. Concept of Content Copy Control Process based on Server Management

2. Content Recording Configuration Example

3. Content Copying Process Sequence based on Server Management

4. Multi-angle Content Copying Process

5. Copying Process accompanying Data Conversion Process (Transcoder) executed in Information Processing Device of Embodiment of Disclosure 6. Copying Process Sequence executed in Information Processing Device of Embodiment of Disclosure 7. Configuration Example of Information Processing Device

1. Concept of Content Copy Control Process Based on Server Management

Figure 1:
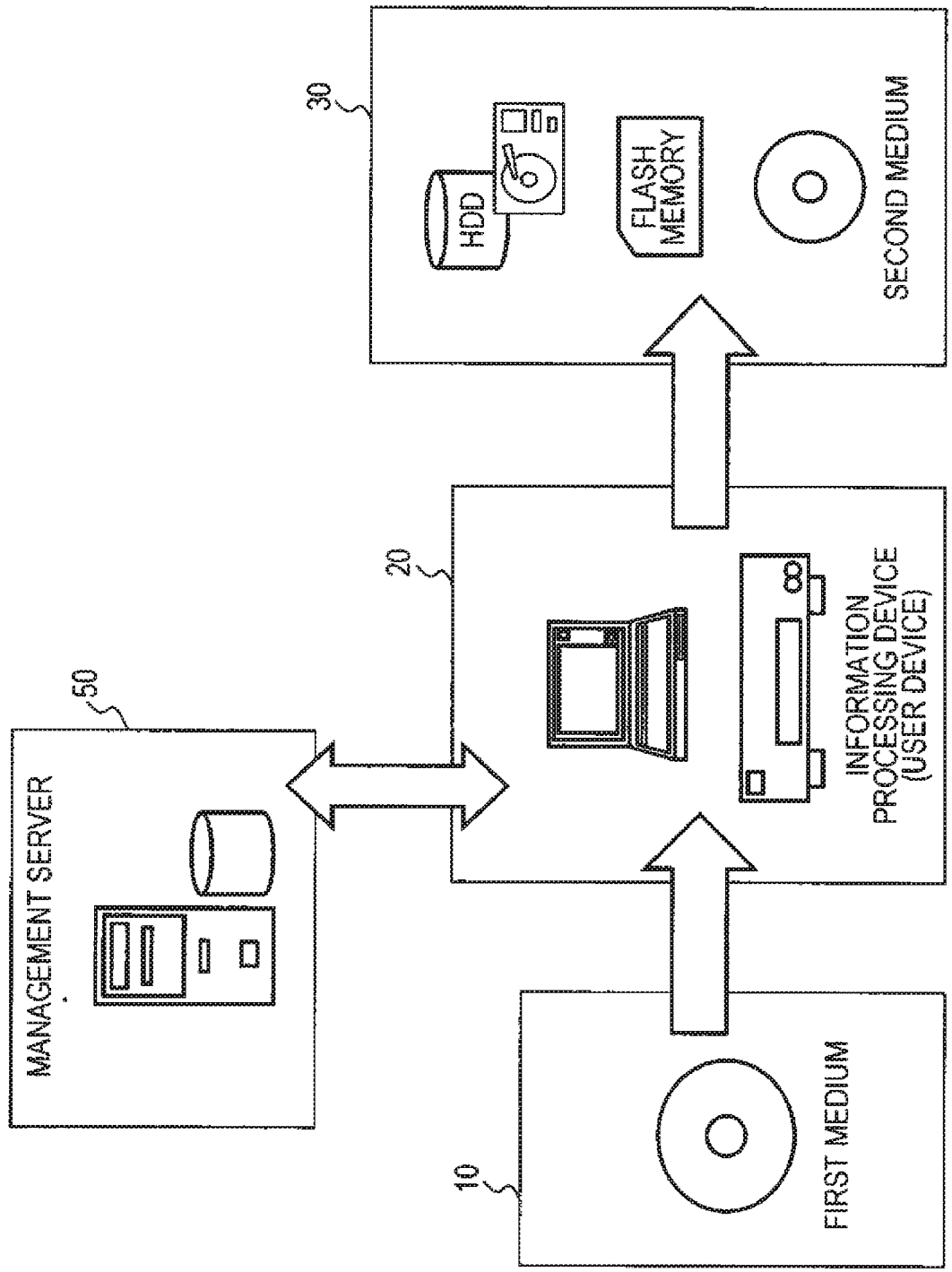
FIG. 1 is a diagram describing the concept of a Managed Copy system.

First, a concept of the content copy control process based on server management will be described with reference to FIG. 1.

For example, the use of much of the content such as movies recorded on a BD (Blu-ray Disc (registered trademark)) or the like is permitted under predetermined copyright management. Accordingly, there are certain limitations in the use of the content recorded on a disc even for a user who has purchased the disc. For example, performing unlimited copying of the content recorded on the disc to media such as other discs is not permitted.

As a copy management configuration of content stored on a medium in this manner, a copy permitting processing configuration is known which is subject to copy permitted information being received from a management server. FIG. 1 is a diagram describing the concept of the Managed Copy system which is an example thereof.

An information processing device 20 is a user's PC, recorder, or the like (recording and reproduction device) and it is possible to mount therein a first medium 10 where a movie or the like is recorded as content with use restrictions, such as copyright management measures, and to perform reproduction.

A process is possible whereby the information processing device 20 copies the content recorded on the first medium 10 to a second medium 30 which is another medium. The second medium 30 is a medium where recording is possible in the information processing device 20, and for example, is a medium such as a hard disk (HDD), a flash memory, or a disc (BD, DVD, or the like) where data recording is possible.

However, when the user freely performs a copying process, a large volume of duplication of the content is generated and there is fraudulent use or circulation of the copy content. In order to prevent a situation such as this, in a case where the information processing device 20 which is a user device executes content copying, there is connection with a management server 50 and copy permitted information is received from the management server 50. In receiving the copy permitted information, for example, procedures, such as recognition of validity of the first medium which the user has and payment of a predetermined fee, are necessary.

By performing a predetermined procedure, it is possible for the information processing device 20 which is the user device to receive the copy permitted information from the management server 50 and to perform content copying subject to the copy permitted information being received. This is the concept of Managed Copy.

2. Content Recording Configuration Example

Next, a configuration example of data, which is recorded on a medium (the first medium 10 of FIG. 1) where use control content which is subject to Managed Copy described above, for example, copyright management, is recorded, will be described.

Encryption and recording are performed in order to prevent fraudulent uses such as fraudulent copying of much of the content such as movies, which are recorded on a typical disc with recorded content, for example, a BD (Blu-ray Disc (registered trademark))—ROM, and the like.

Encryption content in accordance with an AACS (Advanced Access Content System) standard, which is a standard relating to content copyright protection technology, is partitioned into unit segments and recorded as encryption data where different encryption keys for each unit are applied as described above. Using a unit segment encryption configuration, it is possible to control the use of the unit segments and various controls on the use of the content are strictly realized.

The unit which is a partition unit of the content is referred to as a content management unit or a CPS unit, and the encryption key which correspond to each of the CPS units is referred to as a CPS unit key, a unit key, or a title key. One example of a corresponding relationship of the unit partition of the content recorded on the disc and the encryption keys (unit keys) is shown in FIG. 2.

FIG. 2 is an example of a unit key management table which shows a corresponding relationship of the unit (CPS unit) which configures the content recorded on a given medium, for example, one disc, and CPS unit keys which are the encryption keys. The unit key management table is recorded along with the encryption content in the medium (BD or the like).

As shown in FIG. 2, the CPS unit which is configuring data of the content is partitioned into CPS units 1 to n. With regard to each of the CPS units 1 to n, a correspondence is respectively given to the CPS unit keys which are unique encryption keys.

For example, in a case where the CPS unit 1 (CPS1) is reproduced, decryption is performed using a CPS unit key 1 (Ku1). In a case where the CPS unit 2 (CPS2) is reproduced, it is necessary that decryption is performed by applying a CPS unit key 2 (Ku2). As an index where the respective CPS units and CPS unit keys correspond, for example, "Title" is used. "Title" is an index which is set to correspond to each of the CPS units, and it is possible to specify the CPS units and the CPS unit keys by specifying the title.

Figure 3:
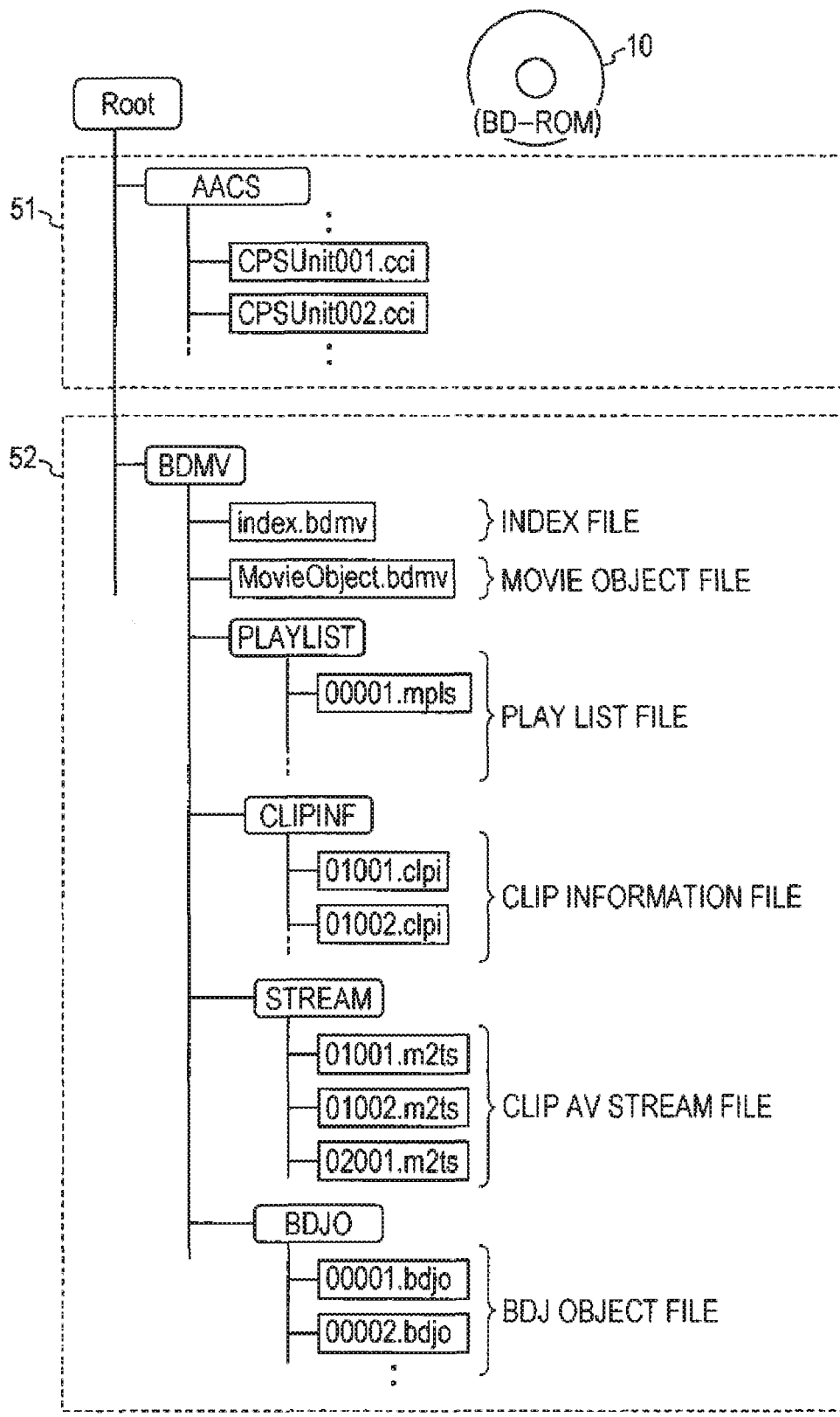
FIG. 3 is a diagram describing a media directory configuration example.

FIG. 3 is a directory in a case where the first medium 10 is a ROM-type Blu-ray Disc (registered trademark) and shows a directory configuration corresponding to BD (Blu-ray Disc (registered trademark)) recording data.

The directory is divided into a management information setting section 51 (ACCS directory) and a data section 52 (BDMV directory) as shown in FIG. 3.

In the management information setting section 51 (ACCS directory), a CPS unit key file, a use control information file, and the like are stored.

On the other hand, in the data section 52, in the BDMV directory below, for example, files such as an index file, a movie object file, a play list file, a clip information file, a clip AV stream file, a BDJO file are recorded.

In the index file, title information is stored as index information which is applied in reproduction processing. The title is the same as the title recorded in the unit key management table described previously with reference to FIG. 2 and is data which is given a correspondence with the CPS units.

The movie object file is a file where programs for reproduction are stored.

The play list file is a file which sets a reproduction sequence of the content. A certain play list file is selected using a title selected by a user and a specific clip information file is specified as a reproduction target in accordance with pass information or a play item included in the selected play list file.

The clip information file is a file which is specified using the play list file and has reproduction position information of the clip AV stream file and the like.

The clip AV stream file is a file where AV stream data which is a reproduction target is stored.

Here, there are cases where a combination of the clip information file and the clip AV stream file is referred to as a clip or a clip file.

The BDJO file is a file where execution control information is stored for a file where JAVA (registered trademark) programs, commands, and the like are stored.

As described above, the image data or the sound data which is a reproduction target is stored in the clip AV stream file, and in the index file, the movie object file, the play list file, and the clip information file, a variety of reproduction control information is stored such as the index, program, sequence information, data position information which are necessary for reproduction of the image data or the sound data stored in the clip AV stream file and these are used as a recording file of the reproduction control information.

The sequence where the content, which the information processing device records on the information recording medium, is reproduced is as below.

First, a specific title is specified from the index file using a reproduction application.

A reproduction program which has been given correspondence with the specified title is selected.

The play list, where the reproduction order and the like of the content are prescribed, is selected in accordance with program information of the selected reproduction program.

The AV stream and the commands are read out as the content execution data using the clip information prescribed in the selected play list, and reproduction of the AV stream and execution processing of the commands are performed.

In the content reproduction process, discrimination of the units and the unit key described previously with reference to FIG. 2 is possible according to the selected title, and the unit key which corresponds to the reproduction target unit (encryption content) is acquired and the decoding process for the unit segment is performed. In the case where the copying process described with reference to FIG. 1 is executed, the information received from the management server 50 is referenced, the copy target data is specified, and the copying process is executed.

3. Content Copying Process Sequence Based on Server Management

Next, a content copying process sequence based on server management will be described with reference to FIG. 4 below. FIG. 4 is a diagram describing a sequence of a Managed Copy which is one example of the content copying process based on management server.

In FIG. 4, from the left, a first medium 110 such as a ROM disc with recorded content such as movies, an information processing device 120 as a user device which reads data such as the content from the first medium 110 and performs the copying process, a second medium 150 which is a medium for copying the content and is configured by a hard disk (HDD), a flash memory, a R/RE disc, or the like, and further a management server (MC server) 140 which executes a provision process of content copy permitting information and the like, are shown.

The information processing device 120 is configured by, for example, a PC, a recording and reproduction device, or the like, and executes a process where read-out data from the first medium 110 is input and data is recorded on the second medium 150 as a copy destination medium which is configured by a hard disk (HDD), a flash memory, a R/RE disc, or the like, that is, executes the content copying process.

The first medium 110 is, for example, a ROM-type Blu-ray Disc (registered trademark), a DVD disc, or the like. The second medium 150 is a medium where data is able to be written, and specifically, for example, is a hard disk (HDD), a flash memory, a R-type or RE-type Blu-ray Disc (registered trademark), DVD disc, or the like.

For example, in the first medium 110 which is configured by the ROM disc or the like, encryption content 113 which is use control content is recorded as shown in the diagram. The encryption content 113 is content formed from an AV (Audio Visual) stream of video content such as HD (High Definition) image content which is high definition moving image data, music data, a game program, an image file, sound data, text data, or the like.

The encryption content 113 has a use management configuration with content management unit (CPS unit) segments as described previously with reference to FIG. 2 and is encryption content where encryption is carried out by applying unit keys (CPS units keys) which differ for each of the CPS unit segments. That is, in order to realize use control which differs for each partition data of the unit segments, encryption is performed using keys (referred to as CPS unit keys, unit keys, or title keys) which differ for each of the units.

Furthermore, in the first medium 110, management data (AACS Data) 112 which is configured by key information, use control information, and the like which is applied in the decryption of the encryption contents 113, and further, a copy control management file (MCMF: Managed Copy Manifest File) 111 which is used at a time of the copying process of the recording content of the first medium 110 are stored. The copy control management file (MCMF) will be described at a later stage.

The management data 112 which is shown as the recording information of the first medium 110 shown in FIG. 4 is, for example, management data with the AACS (Advanced Access Content System) standard which is a standard management system relating to content copyright protection technology, and is data which includes a CPS unit key file where the keys (units keys) are stored which are applied to the decryption of the encryption content 113, use licensing information, a content certificate (CC) which shows the validity of the content, and further, the encryption key block (MKB (Media Key Block)) where the medium keys for acquiring the CPS unit keys are stored, and the like.

The MKB (Media Key Block) will be described. MKB is an encryption key block which is generated based on a key delivery method with a tree structure which is an embodiment of a broadcast encryption method. MKB is a key information block which makes it possible to acquire a medium key [Km] which is a key which is necessary for the decryption of the content using only a process (decryption) based on a text key [Kd] which is stored in the information processing device of the user which has a valid license. This is an application of an information delivery method in accordance with a so-called hierarchical tree structure, it is possible to acquire the medium key [Km] only in a case where the user device (information processing device) has a valid license, and it is not possible to acquire the medium key [Km] in the user device which is made to be invalid (revoking process). In a memory of the information processing device 120 shown in FIG. 2, the text key [Kd] is stored.

The copy control management file (MCMF: Managed Copy Manifest File) 111 which is shown as the recording information of the first medium 110 of FIG. 4 is a file which is applied at a time of executing the copying process of the content 113 recorded on the first medium 110, and for example, is XML descriptive data which includes the data shown in FIG. 5.

(1) Management server URL: access information of the management server which provides the copy permitted information. The access information with regard to the management server 140 is shown in FIG. 4.

(2) Copy data information (dealManifest)

(2-1) Name of play list file: file name of the play list which is the copying target.

(2-2) CPS unit key information: identifying information of the CPS unit keys applied to the decryption process of the copying target content.

(2-3) Copy unit identifier: unit identifying information of the copy unit (MC unit) which shows the copy segments of the Managed Copy.

(3) Content ID: identifier of the content which is the copying target. For example, an ISAN (International Standard Audiovisual Number) number is used as content code information.

The process sequence in a case where, for example, the encryption content 113 which is recorded on the first medium 110 which is a ROM disc is copied to another medium such as the second medium 150 which is configured by a hard disk, an R/RE disc, or the like, will be described with reference to FIG. 4.

Firstly, in step S11, the information processing device 120 sends a copy execution request (Offer Request) to the management server 140 by applying server information (URI and the like) recorded in the copy control management file (MCMF) 111 recorded on the first medium 110.

At this time, the content ID and the like which correspond to the content which is the copying process target is sent to the management server 140.

One example of data included in the copy execution request is shown in FIG. 6. For example, the data below is included in the copy execution request as shown in FIG. 6. The information is (a) Content ID: identifier of the content stored on the first medium, (b) Content Certificate ID: certificate for confirming the validity of the content, (c) Medium identifier: identifier of the first medium which is the copy original, (d) Random number: data validity confirmation data, (e) Language code: encode information for the language, used in the information processing device.

Each piece of information out of the information (a) to (c) is read out from the first medium 110. The random number (d) is generated in the information processing device 120. The language code (e) is sent by acquiring the language code stored in advance in a memory of the information processing device 120.

Here, the language code is used for deciding the language and the like of the offer detail information included in the response provided to the management server 140.

Returning to FIG. 4, the description of the content copying process sequence in accordance with server management will continue. In step S12, the management server 140 executes a verification process such as the validity of the received information such as the content ID received from the information processing device 120, and in a case where it is confirmed that there are no problems, the server response information (Offer Response) 131 is generated and sent to the information processing device 120.

The basic information included in the server response information (Offer Response) 131 which the management server 140 provides to the information processing device 120 will be described with reference to FIG. 7.

Each piece of information below is included in the basic information.

(1) Offer detail information (1a) Title/abstract/description (title/abstract/description): information on the title, abstract, and description which correspond to the copy permitted content.

(1b) Copy unit identifier (MCU): identifier which identifies the copy unit as the copy segment.

(1c) Price information (price): price information of copying.

(1d) Price auxiliary information (priceInfo): auxiliary information on price.

(1e) Payment server URL (financialHTMLURL): access information to a server which performs a payment process of a copying fee.

(1f) Copy destination information (mcotInfo): information which shows types of media and the like which are permitted as a copy destination device. For example, media types such as HDD or flash memory are recorded.

(2) Random number (mcmNonce): random number for data validity confirmation (3) Copy data information (File name to be copied) (=dealManifest)

(3a) Name of play list file (PlayList file name): file name for the play list which is the copy target. Here, it is possible to also specify the clip information file and clip AV stream file using the specification of the play list.

(3b) CPS unit key information (Index to identify the CPS Unit Key): identifying information of the keys (CPS unit keys) for decryption of the copy content.

(3c) Copy unit identifier (MCUi): indentifying information of the copy unit (MCU) which shows the copy segment.

(4) Server public key certificate (MCScert): certificate where a public key of a server is stored which is used in encryption communication, signature confirmation, and the like.

(5) Signature (signature): signature data for confirming manipulation with regard to the entire data.

This information is the basic information included in the server response information (Offer Response) 131 which the management server 140 provides to the information processing device 120. This information is set with regard to the respective copy units (MCU) as the copying process segments.

For example, the copy unit is set according to the medium for copying even for the same content A. That is, there is a setting such as copy unit 0001 of the content A with regard to a hard disk, copy unit 0002 of the content A with regard to a flash memory.

Here, in the server response information (Offer Response) 131 shown in FIG. 7, similar information is included as the information recorded in the copy control management file (MCMF) 111 recorded in the first medium 110 described with reference to FIG. 5. That is, the Copy data information (File name to be copied) (=dealManifest) of (3) described above. The copying process of this information is performed with priority on the received information from the management server 140. This is because there is a possibility that the received information from the management server 140 is sequentially updated.

Returning to FIG. 4, the description of the content copying process sequence in accordance with server management will continue. In step S12, the management server 140 executes a verification process such as the validity of the received information such as the content ID received from the information processing device 120, and in a case where it is confirmed that there are no problems, the server response information (Offer Response) 131 is generated and sent to the information processing device 120.

The information processing device 120 which receives the server response information (Offer Response) 131 applies the response information (Offer Response) 131 received from the management server 140 and a catalog list (copy permitted list 121) of the copy permitted content is displayed on the display section of the information processing device 120. In the list, the price and the like are set in a case where, for example, copying is executed with regard to each item of the content.

In step S13, content selection is executed where the user specifies content which is the copy target from the copy permitted content list and the like. Furthermore, in step S14, the information processing device 120 executes payment processing in accordance with the copying process with the management server 140. Specially, a transfer process of payment data 132 and the like is performed between the information processing device 120 and the management server 140. Here, the server which executes the payment process may be a payment server which is different from the management server. In addition, in a case where copying of the content which is set so that the copying process is free is executed, the payment process is omitted.

After the completion of the payment process which is executed as necessary, in step S15, the information processing device 120 sends a request for the copy permitted information to the management server 140. In step S16, the management server 140 confirms that the payment is carried out according to the copy permitted information request from the information processing device 120, and copy permitted information 122 is generated and sent to the information processing device 120.

In step S17, the information processing device 120 executes the content copying process subject to the copy permitted information 122 being received from the management server 140. That is, the encryption content 113 is read out from the first medium 110, the data which is the copy target is selected, the decryption process is performed, and data copying is executed with regard to the second medium 150 configured by a hard disk (HDD), a flash memory, a R/RE disc, or the like which is a copy destination.

Here, the content copying process is executed, for example, in the order below. The processes are performed in the sequence such as (1) Reading out of the encryption content from the first medium 110 (copy original medium), (2) Decryption process of encryption contents in accordance with a first management system which corresponds to the first medium 110 (copy original medium), (3) Encryption process of the content in accordance with a second management system which corresponds to the second medium 150 (copy destination medium), (4) Recording process of the encryption content with regard to the second medium 150 (copy destination medium).

In this manner, in a case where the encryption content is read out from the disc and copied to a medium such as another disc, the encryption content which is the copy target is decrypted at once, and after that, a process is performed where re-encryption is executed and recording is performed in accordance with a copyright management system standard which corresponds to the copy destination medium. By performing a process such as this, copy control is carried even for the copy destination medium and it is possible to prevent the fraudulent use or distribution of the copy content.

Here, a collective term for the content copyright management system which relates to digital data is a DRM (Digital Rights Management) system. There are various media which are able to record digital data and various DRM systems are adopted according to the media. In a case where digital data is copied between media which adopt different DRM systems, copying is performed by changing from the DRM system which is adopted by the copy original medium to the DRM system which is adopted by the copy destination medium. By using a configuration such as this, it is possible to prevent the fraudulent use or distribution of the copy content.

In this case, in a case where the management system of the copy original (which is the first DRM) and the content management system of the copy destination (which is the second DRM) are different, as in the sequence of (1) to (4) described above, it is necessary that the encryption content of the copy original is decrypted at once, and a process is performed in accordance with the management system of the copy destination (the second DRM), for example, the re-encryption which uses a different encryption key or encoding is performed and recording is performed.

The decryption process of the encryption content in (2) described above in accordance with the first management system is performed as a decryption process of the CPS unit segments where the CPS unit keys are applied in a case where the first management system is a system in accordance with the AACS standard.

Here, it is assumed that the second management system which corresponds to the copy destination medium (the second medium 150) is a management system which is AACS in some cases and which also corresponds to various other standards according to the medium such as CPRM, MagicGate, and VCPS.

Figure 8:
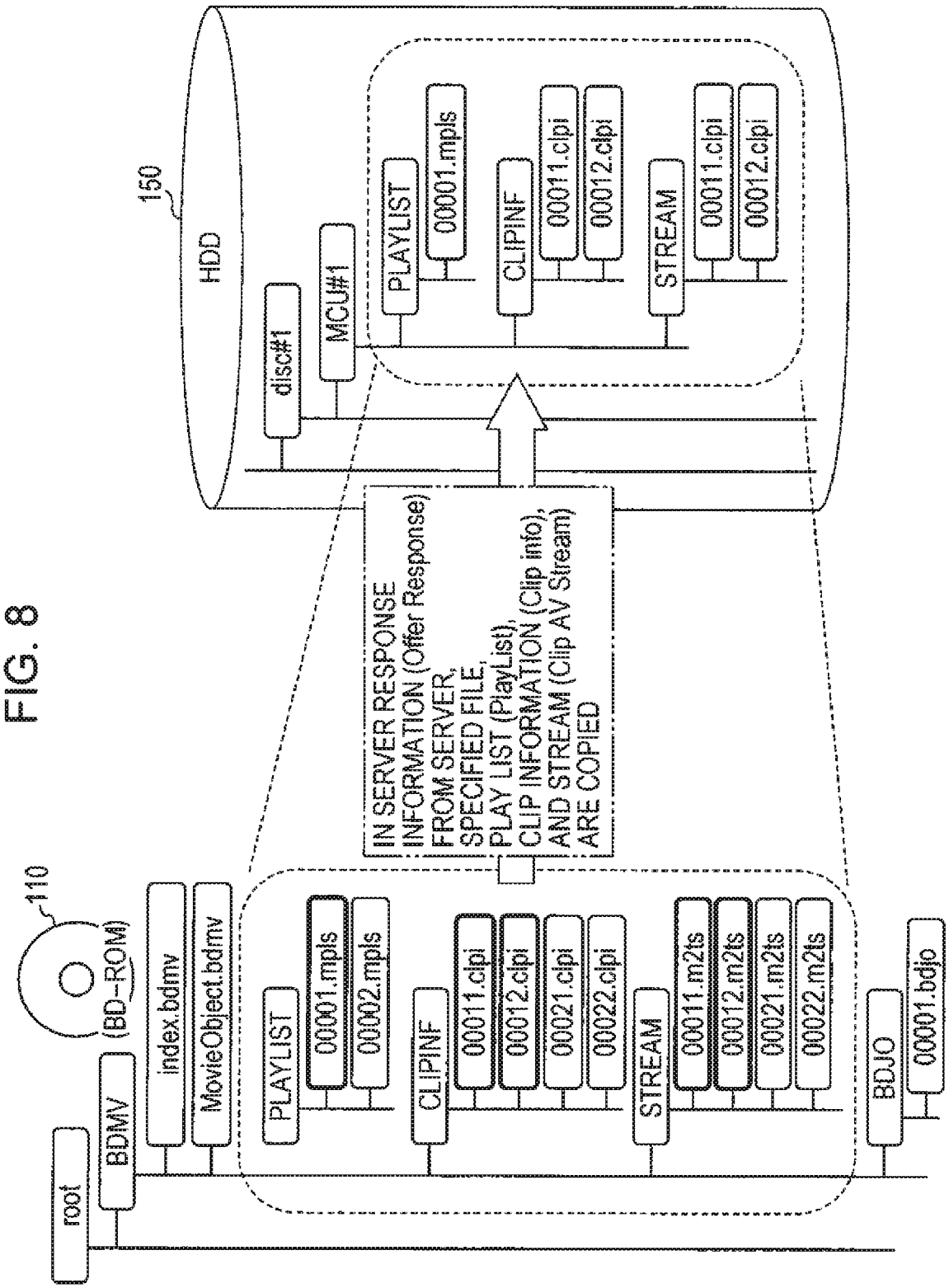
FIG. 8 is a diagram describing an example of a copying process with regard to a second medium (hard disk (HDD)) which is a copy destination from a first medium which is an original copy.

On specific example of copying is shown in FIG. 8. FIG. 8 shows the first medium 110 which is a copy original and a hard disk (HDD) as an example of the second medium 150 which is the copy destination.

On the left side of FIG. 8, in the first medium 110, various files are recorded in accordance with the directory configuration described previously with reference to FIG. 3. From the plurality of files, a process is executed where a specific file is selected and only the selected file is copied to the hard disk (HDD) which is the second medium 150.

An example is shown where the files shown by thick lines are selected and copied from the directory of the first medium 110 shown in the left side of FIG. 8. That is, the files Play list file (PLAYLIST): 00001.mpls
Clip Information file (CLIPINF): 00011.cpli
Clip Information file (CLIPINF): 00012.cpli
AV stream file: 0011.m2ts
AV stream file: 0012.m2ts
are selected and copied.

In this manner, for example, at a time of a given copying process, only from the play list file to the AV stream file is recorded without performing the copying of the management information files such as the index file, the movie object file, and the like.

Here, the file selection is executed by applying the information included in the server response information (Offer Response) 131 described previously with reference to FIG. 7.

As described previously with reference to FIG. 7, in the server response information (Offer Response) 131, the information of (3a) name of play list file (3b) CPS unit key information (3c) copy unit identifier (MCUi) are stored as the copy data information (File name to be copied) (DealManifest) of (3), the copy unit is selected as the copy segment by applying the information, the name of the play list file which corresponds to the selected copy unit is acquired, and the play list file is acquired. Furthermore, the clip information file and the clip AV stream file which are specified by the acquired play list file are acquired. Furthermore, the CPS unit key which corresponds to the copy unit is acquired and the decryption of the content such as the clip AV stream file is executed. After that, furthermore, after the encryption process and the like which correspond to the DRM system of the second medium 150 are executed, the files are set on the hard disk (HDD) which is the second medium 150.

4. Multi-Angle Content Copying Process

As described above, the copying process (MC: Managed Copy) is possible with server management even for the use control content and the user is able to perform reproduction and use of the content from the second medium which is the copy destination medium.

However, as previously described, at a time of the copying process, a data conversion process is often performed using a transcoder (data conversion section) for, for example, increasing the compression rate. For example, the transcoder performs processes such as converting MPEG-2 encoded data stored in the original copying medium to AVCHD encoded data, MPEG4-AVC encoded data, or the like. The AVCHD or MPEG4-AVC data generated using the transcoder is recorded on the copy destination medium (for example, a hard disk or the like).

However, when data conversion such as this is performed, there are cases where data format or control information of the data before conversion is lost or changed. As a result, there are cases where recording is performed so that the copy data which is recorded on the copy destination medium as conversion data becomes data which is not able to be reproduced in the same manner as the reproduction of the original data.

In particular, in a case where the copying process target data is multi-angle content, there is a problem where there is a loss of or a change in information which is necessary for angle changing and it is not possible to normally perform angle changing even when the copy data after conversion is reproduced.

Here, the multi-angle content is content which includes captured images from a plurality of angles and where it is possible to switch and display the angle according to, for example, an input from a user.

Below, a configuration which resolves the problem will be explained.

For example, in a case of multi-angle content which is recorded on a BD-ROM using a MPEG-2 format, a data position where switching to an image with a different angle is possible (angle change point (position)) is prescribed in advance.

It is necessary that the reproduction target data which is the angle change point (configuration data (pictures) of the clip AV stream) satisfies predetermined conditions.

In addition, it is necessary for performing the angle changing reproduction process that the information such as the data position of the angle change point is recorded in the reproduction control information file (such as the clip information file or the play list file).

At a time of the copying process, when the transcoder (data conversion section) executes conversion (transcoding) of the encoding format, the reproduction target data (clip AV stream) or the reproduction control information file (such as the clip information file or the play list file) described above are converted, and due to the conversion, there is a change in or loss of the data necessary for normal angle changing or the control information, and angle changing of the copy data after conversion is not possible.

In the data with the MPEG-2 format data, there is a condition that the picture of the angle change point is a picture at the head of closed GOP which configures the clip AV stream. The closed GOP will be described at a later stage.

In addition, in the case where angle changing reproduction is performed, it is necessary to acquire packet position information (SPN: source packet number) of the angle change point in the clip AV stream from the reproduction control information file (clip information file).

At a time of the data conversion process during the copying process, when the data conditions or the reproduction control information of the angle change point is lost, normal angle changing is not possible during reproduction of the content from the second medium which is the copy destination medium.

First, the data structure of the original content which is recorded on the first medium which is the copy target data will be described below with reference to FIG. 9.

The data described below is an example of data recorded in accordance on a BD-ROM disc in a MPEG-2 encoding format.

A configuration example of the play list file which is a control information file, the clip information file, and the clip AV stream file which is a storage file of the reproduction data will be described.

First, a configuration example and a use example of the play list file, which is set in the disc where the original contents which are the copy original are stored, will be described with reference to FIG. 9.

Figure 9:
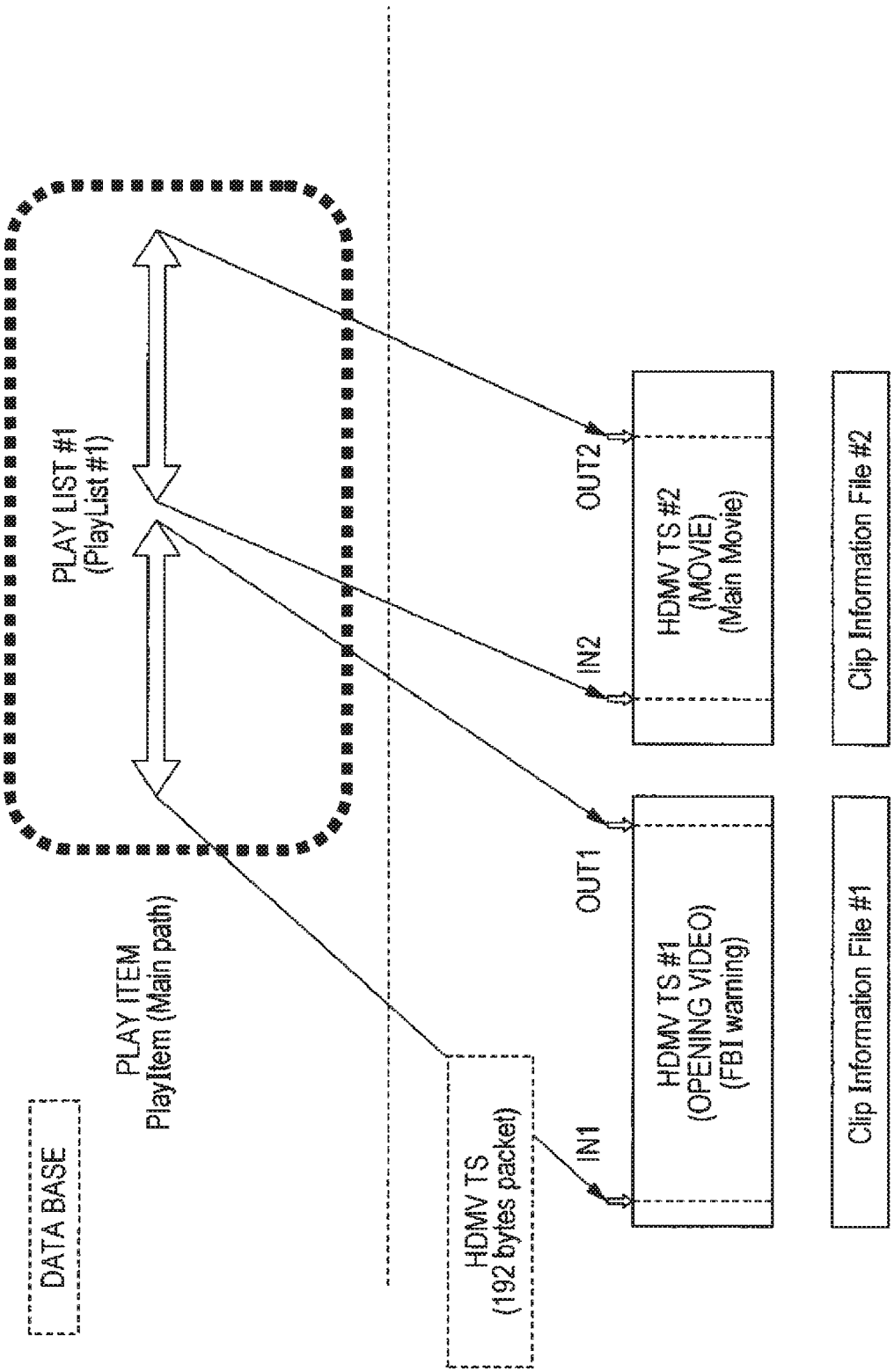
FIG. 9 is a diagram describing a configuration example and a use example of a play list file.

In FIG. 9, a content reproduction process example is shown where a play list file #1, which is set in the disc where the original contents which are the copy original are stored, is used.

A specific play list is selected according to, for example, the title specified for reproduction by the user, the clip (clip information file, clip AV stream file) is selected in accordance with the play list, and the reproduction process is executed.

The play list file #1 shown by FIG. 9 is an example of a play list which has the simplest configuration. A play item, which has reproduction specification information which shows a reproduction start position and an end position with regard to the clip information file of the video content, is set. The play item is configured by two play items.

There is a first play item which has a reproduction start point (IN1) and a reproduction end point (OUT1) of an opening video, a second play item which has a reproduction start point (IN2) and a reproduction end point (OUT2) of a main video.

In the case where the play list file #1 is selected according to, for example, the title specified for reproduction by the user, the clip (clip information file, clip AV stream file) which has the opening video is selected in accordance with the play item which precedes the play list file #1 and reproduction is performed, and after that, the clip (clip information file, clip AV stream file) of the main video is selected in accordance with the play item which is next and reproduction is performed.

The configuration of the play list file is not limited to a file which has a simple configuration such as the play list file #1 shown in FIG. 9. There are play list files which have complex configurations for performing various complex data reproduction processes.

As an example of the play list file where complex data reproduction is executed, an example of a play list file which has a sub path will be described with reference to FIG. 10.

Figure 10:
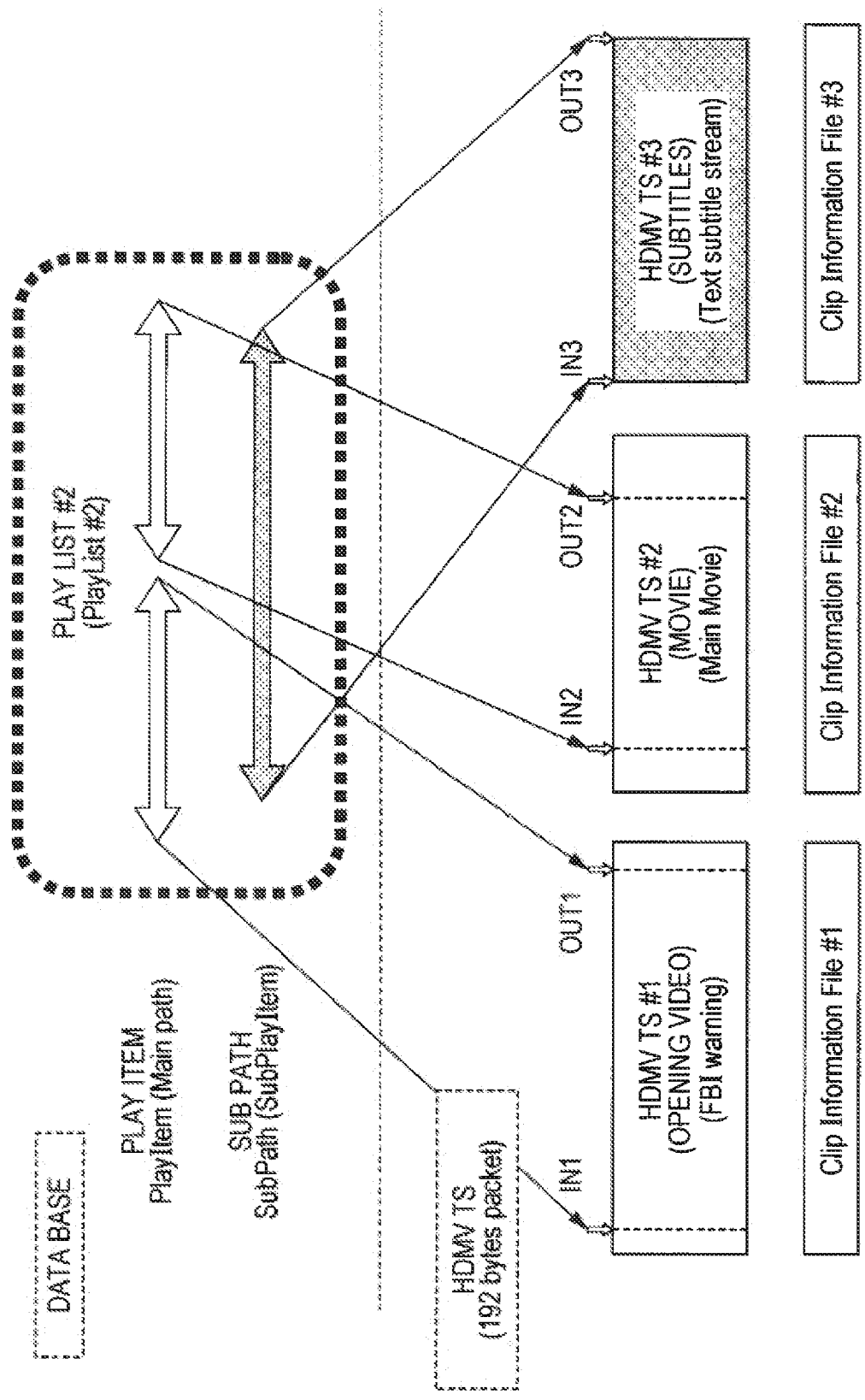
FIG. 10 is a diagram describing a configuration example and a use example of a play list file.

In a play list file #2 shown in FIG. 10, the play item which has the reproduction specification information, which shows the reproduction start position and the end position with regard to the clip information file of the video content, and the sub path which has reproduction specification information of subtitles are set. The play item is configured by two play items.

There is the first play item which has the reproduction start point (IN1) and the reproduction end point (OUT1) of the opening video, the second play item which has the reproduction start point (IN2) and the reproduction end point (OUT2) of the main video.

The sub path is configured as information which has a reproduction start point (IN3) and reproduction end point (OUT3) of subtitle data.

In a case where the subtitle data which is, for example, specified using the sub path is Japanese subtitles, the image content from the clip information file specified using the play item of the play list #2 is reproduced and the subtitle data from the clip, where the subtitle data selected using the sub path is stored, is reproduced along with the reproduction of the image content.

For example, in a case where subtitles are displayed in English, a different play list is used.

In a case where the play item which corresponds to a main pass and also the sub path is included in the play list file in this manner, the reproduction process, where information on the two passes is used, is possible, and for example, subtitle reproduction which accompanies the video reproduction is possible.

Here, in the play list file, there is the file where the sub path is set as shown in FIG. 10 and the file where the sub path is not set as shown in FIG. 9, and in the medium such as the BD where the original content is stored, the plurality of play list files of different types are recorded.

In the case of multi-angle content, the plurality of clip AV stream files where each of the captured images from the different angles are stored and the plurality of play list files which correspond to the plurality of clip AV stream files are used.

For example, an example where three angles (angle #1, angle #2, and angle #3) are set in a reproduction sector which is multi-angle content will be described with reference to FIG. 11.

Figure 11:
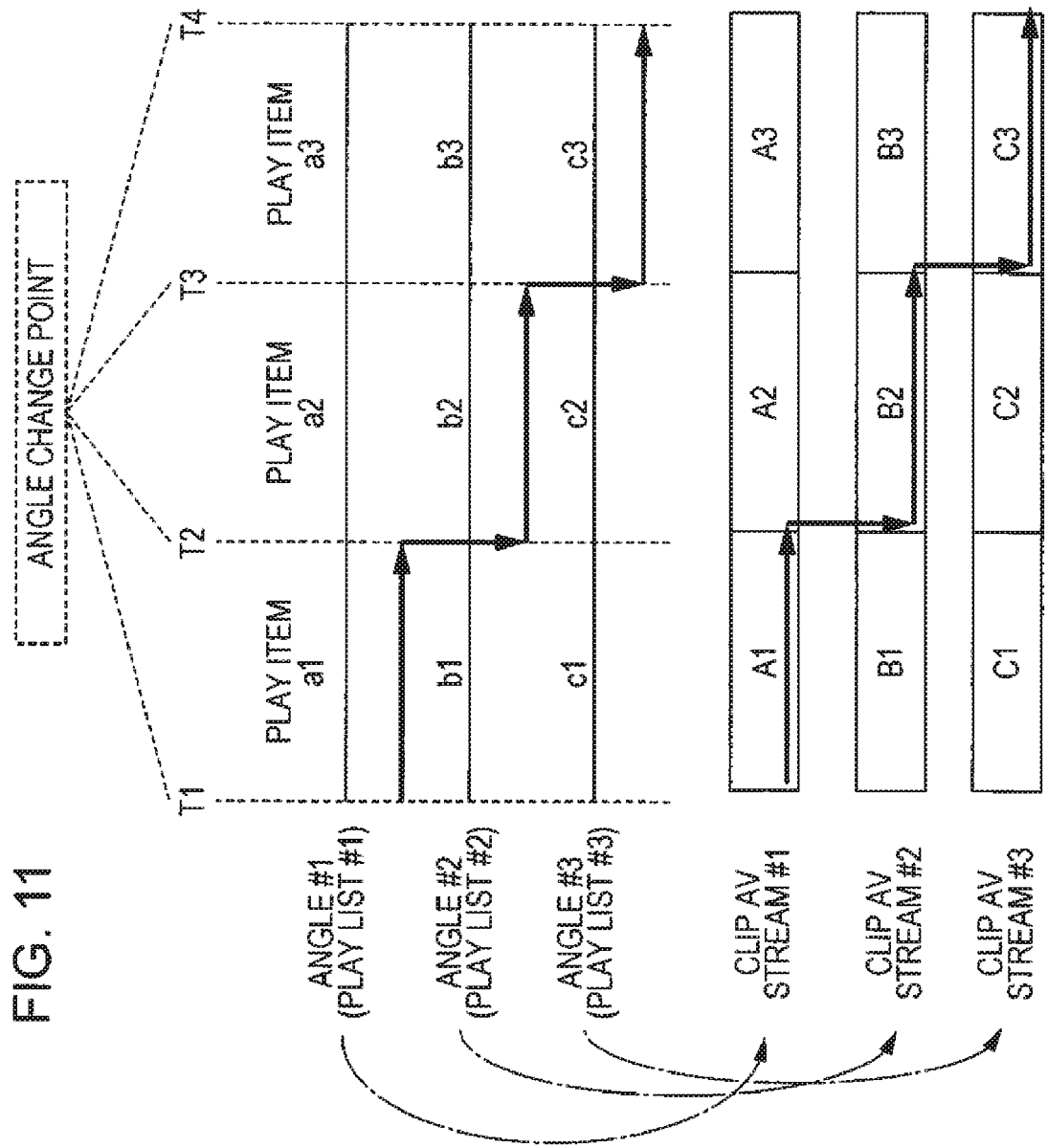
FIG. 11 is a diagram describing data which is applied in an angle changing process.

As shown in FIG. 11, clip AV streams #1 to #3, where the captured images of each of the angles are stored, are used. Each of the clip AV streams #1 to #3 use the play lists #1 to #3 which are set to correspond to each of the above and are reproduced.

In the case of the example shown in FIG. 11, the angle #1, the angle #2, and the angle #3 are each reproduced using the play list #1, the play list #2, and the play list #3. In the case of the example shown in FIG. 11, the reproduction sector is divided into different play items using the position (angle change point) of the timing when it is possible to move from one angle to another angle.

For example, when the reproduction sector of the angle #1 is divided into three, the play list #1 is configured by three play items corresponding to each of reproduction sectors a1, a2, and a3, and the AV stream data of a clip #1 which corresponds to each of the reproduction sectors a1, a2, and a3 is set as A1, A2, and A3.

When the reproduction sector of the angle #2 is divided into three, the play list #2 is configured by three play items corresponding to each of reproduction sectors b1, b2, and b3, and the AV stream data of a clip #2 which corresponds to each of the reproduction sectors b1, b2, and b3 is set as B1, B2, and B3.

When the reproduction sector of the angle #3 is divided into three, the play list #3 is configured by three play items corresponding to each of reproduction sectors c1, c2, and c3, and the AV stream data of a clip #3 which corresponds to each of the reproduction sectors c1, c2, and c3 is set as C1, C2, and C3.

The play item of the reproduction sector a1, b1, and c1 has a grouping of the same in point (IN_time) and out point (OUT_time), and for example, the IN_time is T1 and the OUT_time is T2. In the same manner, the play item of the reproduction sector a2, b2, and c2 has a grouping of the same in point (IN_time) and out point (OUT_time), and for example, the IN_time is T2 and the OUT_time is T3. Further, the play item of the reproduction sector a3, b3, and c3 has a grouping of the same in point (IN_time) and out point (OUT_time), and for example, the IN_time is T3 and the OUT_time is T4. In this case, T1, T2, T3, and T4 are reproduction time information and show a PTS (Presentation Time Stamp) which show the reproduction time of each of the AV streams.

The basis process in a case where the angle is seamlessly changed at a time of the reproduction process of the multi-angle content will be described. A control section of the reproduction device which executes the reproduction of the multi-angle content determines whether or not an angle changing instruction is input by the user. In a case where the angle changing instruction is detected, the control section determines whether or not the reproduction position at the current point in time is the angle change point. In a case where the current reproduction position is not the angle change point, the control section waits until the reproduction position reaches the angle change point.

In a case where it is determined that the reproduction position has reached the angle change point, the control section moves (jumps) to the position of the head of the AV stream which is prescribed in the play item of the angle specified at the reproduction position. Then, the AV stream data is reproduced.

In this manner, angle changing is sequentially performed according to, for example, the instruction from the user. In the example of FIG. 11, AV stream data A1 of the clip AV stream #1 which corresponds to the reproduction sector of the angle #1 is reproduced, AV stream data B2 of the clip AV stream #2 which corresponds to the reproduction sector of the angle #2 is reproduced, and next, AV stream data C3 of the clip AV stream #3 which corresponds to the reproduction sector of the angle #3 is sequentially reproduced.

Information in the head address and the end address of each of the play items and information on data size (amount of bits) are acquired from each of the clips of the clip information file.

Figure 12:
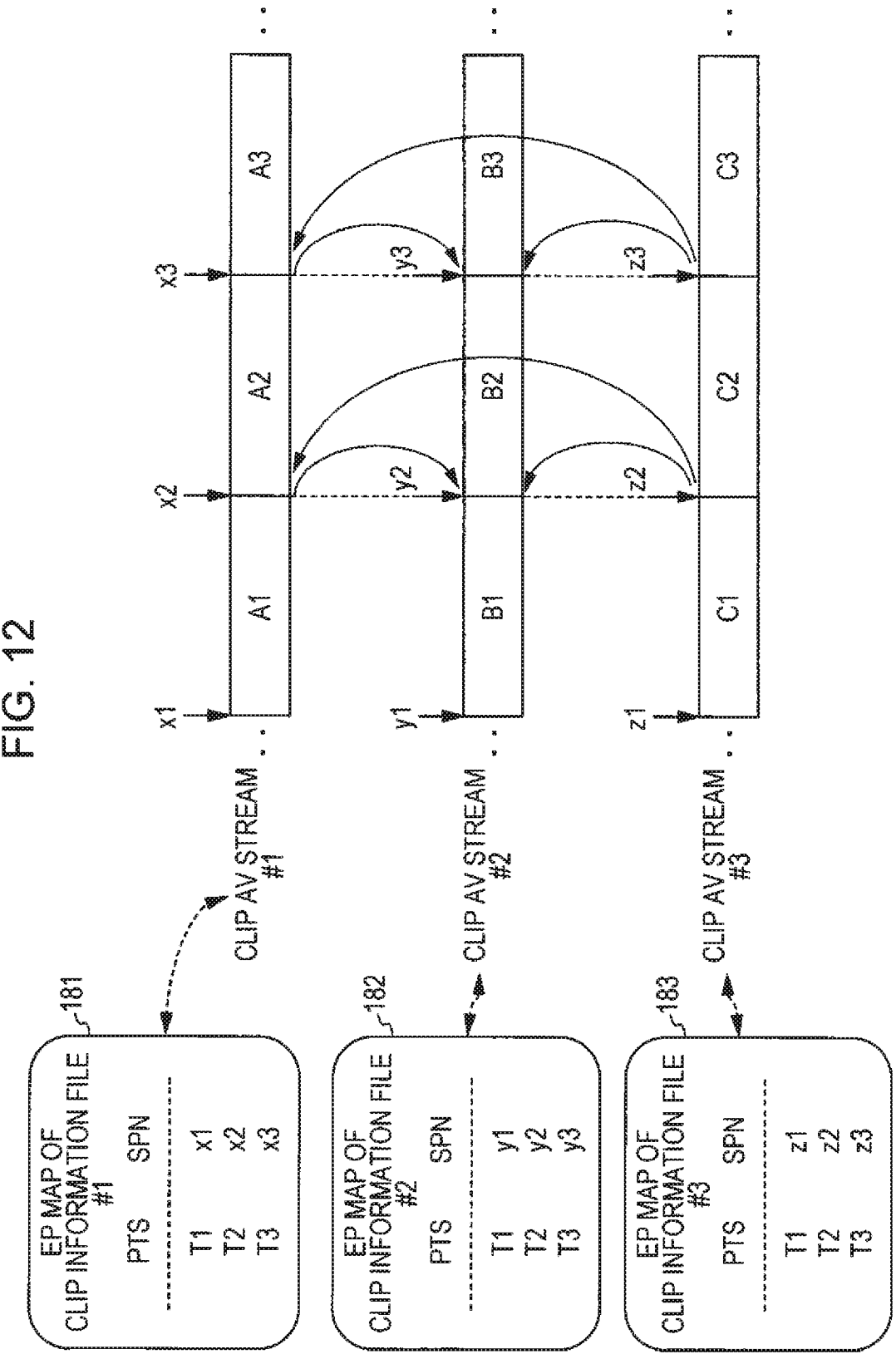
FIG. 12 is a diagram describing data which is applied in an angle changing process.

FIG. 12 is a diagram describing data content of the clip information file which is applied in the angle changing process.

Video stream data in each of the AV stream data A1, B1, and C1 starts from the closed GOP which starts from the sequence header. The time stamp (PTS: presentation time stamp) which shows each of the reproduction times of the display start is the same, T1, and in addition, each of the display times is the same, (T1-T2).

Here, the closed GOP is a GOP which is closed in one reproduction sector (for example, reproduction sectors A1, B1, C1, and the like) and is a group of pictures (GOP) which are encoded so as to be completed in the sector.

The MPEG encoding data is configured by a P picture and a B picture where encoding and decryption processes are performed with two pictures of an I picture, which is a encoded image where encoding and decryption processes for which a reference image is not necessary are possible, and a P picture, where encoding and decryption processes are performed with one picture as a reference image, used as references. The P picture and the B picture reference the previous or the next image and perform encoding or decryption.

The GOP (Group Of Pictures) is prescribed as a unit (coding process unit) of a collection formed from a plurality of the I, P, and B pictures. The streams are configured from a plurality of GOP (Group Of Pictures).

The closed GOP is a GOP which has a setting where it is possible to execute the decoding and decryption processes of each of the I, P and B pictures included in the GOP (Group of Pictures) without referencing the GOP pictures other than the closed GOP.

In the stream, the closed GOP such as this and the GOP, which is not closed where it is necessary to reference a picture in another GOP at a time of the encoding and decryption process, are mixed.

It is preferable if the picture position which is angle change point is an I picture at the head of the closed GOP.

Even with regard to the AV stream data A2, B2, and C2, each of the video stream data starts from the closed GOP which starts from the sequence header, and each of the time stamps (PTS: presentation time stamp) of the display starts is the same, T2, and each of the display times is also the same, (T2-T3).

Furthermore, with regard to the AV stream data A3, B3, and C3, each of the video stream data starts from the closed GOP which starts from the sequence header, and each of the time stamps (PTS: presentation time stamp) of the display starts is the same, T3, and each of the display times is also the same, (T3-T4).

Here, in all of the video stream data of the AV stream data A1, B1, C1, A2, B2, C2, A3, B3, and C3, the picture which is initially displayed in the closed GOP is an I picture.

Audio stream data in the AV stream data A1, B1, and C1 are each the same. In addition, audio stream data in the AV stream data A2, B2, and C2 are also each the same. Furthermore, audio stream data in the AV stream data A3, B3, and C3 are also each the same.

Here, in the AV stream data A1, B1, and C1, other than the video packets where the video data is stored, an audio packet where the audio data is stored, a presentation graphic (PG) packet where the subtitle data is stored, and the like are included. The head packets of each of the AV stream data A1, B1, and C1 are video packets and the payload starts from the I picture which starts from the sequence header and the GOP header.

The head packets of each of the AV stream data A2, B2, and C2 are also video packets and the payload starts from the I picture which starts from the sequence header and the GOP header.

The head packets of each of the AV stream data A3, B3, and C3 are also video packets and the payload starts from the I picture which starts from the sequence header and the GOP header.

In addition, as previously described, the GOP which includes the head I picture is set as the closed GOP where encoding and decryption are possible using only the I, B, and P pictures in the GOP. By performing setting in this manner, according to the angle changing, it is possible to perform decryption and reproduction without referencing a picture of another GOP in terms of the image reproduction from the angle change point of all of the video stream data of A1, B1, C1, A2, B2, C2, A3, B3, and C3.

In the clip information file which is one of the reproduction control information files with regard to the clip AV stream file, an EP_map is recorded which is a map where the corresponding data of the time stamp (PTS: presentation time stamp) is recorded as reproduction time information of an end point (EP), which is a position where random reproduction starting is possible in the clip, and the source packet number (SPN) which shows the packet position (number of packets from the head) in the clip AV stream file.

Here, the source packet number (SPN) is a number which is incremented by one in order of the source packets in the clip AV stream file, and the source packet number at the head of the clip AV stream file is zero.

For example, x1, x2, and x3 which are the source packet numbers (SPN) of each of the heads of the AV stream data A1, A2, and A3, which correspond to the angle change points which configure the clip AV stream file #1 shown in FIG. 12, are equivalent to the number of packets from the head of the AV stream file #1 (from the data A1).

In the same manner, y1, y2, and y3 which are the source packet numbers (SPN) of each of the heads of the AV stream data B1, B2, and B3, which correspond to the angle change points which configure the clip AV stream file #2, are equivalent to the number of packets from the head of the AV stream file #2 (from the data B1).

In the same manner, z1, z2, and z3 which are the source packet numbers (SPN) of each of the heads of the AV stream data C1, C2, and C3, which correspond to the angle change points which configure the clip AV stream file #3, are equivalent to the number of packets from the head of the AV stream file #3 (from the data C1).

In the case of performing setting in this manner, the EP map, where the clip information files #1 to #3 which respectively correspond to the AV stream files #1 to #3 are recorded, becomes the EP map which includes data which shows EP maps 181 to 183 shown in FIG. 12.

In the EP map 181 of the clip information file #1 of the clip AV stream #1, the packet positions x1, x2, and x3 of the angle change point (number of packets from the head of the clip AV stream #1) and the PTS (presentation time stamp) T1, T2, and T3 which show the reproduction time information of the packets are made to correspond and are recorded. The source packets specified using x1, x2, and x3 are packets which start from the I picture of the closed GOP.

In the EP map 182 of the clip information file #2 of the clip AV stream #2, the packet positions y1, y2, and y3 of the angle change point (number of packets from the head of the clip AV stream #2) and the PTS (presentation time stamp) T1, T2, and T3 which show the reproduction time information of the packets are made to correspond and are recorded. The source packets specified using y1, y2, and y3 are packets which start from the I picture of the closed GOP.

In the EP map 183 of the clip information file #3 of the clip AV stream #3, the packet positions z1, z2, and z3 of the angle change point (number of packets from the head of the clip AV stream #3) and the PTS (presentation time stamp) T1, T2, and T3 which show the reproduction time information of the packets are made to correspond and are recorded. The source packets specified using z1, z2, and z3 are packets which start from the I picture of the closed GOP.

In the control section of the reproduction device which reproduces the multi-angle content, the SPN (source packet number), which is registered in the EP_map which includes the clip information file, is referenced and the packet position of the angle change point is acquired. Furthermore, the decryption of the closed GOP described above is executed from the packet of the acquired packet position, and by performing reproduction, the angle changing reproduction process is executed.

Next, a specific syntax (data structure) of each of the files below, which are the reproduction control information files recorded on the first medium which is the copy original, will be described with reference to FIG. 13 below.

The specific configuration of each of the files
(A) Play list file
(B) Clip information file
will be sequentially described.

(A) Play List File

First, the syntax (data structure) of the play list file (PlayList( )) will be described with reference to FIG. 13.

The length is a 32-bit unsigned integer which shows the number of bytes from immediately after the length field to the last PlayList( ). That is, the length is a field which shows the number of bits from reserved_for_future_use to the last PlayList. After the length, a 16-bit reserved_for_future_use is prepared.

The number_of_PlayItems is a 16-bit field which shows the number of the play items in the play list. For example, in the case of the examples of FIGS. 9 and 10, the number of the play items is two. The value of PlayItem_id is allocated from zero in the order in which the PlayItem( ) appears in the play list.

A PlayItem( ) field 201 records detailed information on each of the play items. Here, information on the clips which are specified using each of the play items and the like are recorded. The detailed information will be described with reference to FIG. 14 at a later stage.

The number_of_SubPaths is a 16-bit field which shows the number of sub paths (number of entries) in the play list. For example, in the case of the play list example shown in FIG. 10, the number of sub paths is one. The value of SubPath_id is allocated from zero in the order which the SubPath( ) appears in the play list.

The detailed information on each of the sub paths is recorded in block SubPath( ). Here, the start point, the end point, and the like of the reproduction of the clips which are specified by each of the sub paths are recorded.

FIG. 14 is a diagram which shows a portion of the syntax of the block PlayItem( ) and shows the field which relates to the disclosure in the center.

The field length has a data length of 16 bits and shows the data length from immediately after the field length to the last block PlayItem( ).

The field Clip_Information_file_name [0] has a data length of 40 bits (5 bytes) and the file name of the clip information file which is referenced by the block PlayItem( ) is shown. In the play item, the file name of the clip information file which is shown by the field Clip_Information_file_name [0] is read out. The field Clip_codec_identifier [0] has a data length of 32 bits (4 bytes) and shows the codec method of the clip AV stream which is used in the play item of the block PlayItem( ).

A multi-angle content identifying field 211 is a flag setting field which has a data length of 1 bit. In is_seamless_multi_angle, a flag is set which shows whether or not there is correspondence with multi-angle.

If the is_seamless_multi_angle==1, the data reproduced using the play item is content which corresponds to multi-angle and is a play item which corresponds to the clip AV stream which is selected and reproduced according to an angle changing request from a user.

If the is_seamless_multi_angle==0, that the data reproduced using the play item is not content which corresponds to multi-angle is shown.

A multi-angle content management information recording field 212 is a multi-angle content management information recording field. For example, information relating to the clip and information on angle numbers and the like is described. If the value of a flag is_multi_angle of the multi-angle content indentifying field 211 is a value which shows the correspondence to multi-angle (is_seamless_multi_angle==1), information for managing multi-angle shown in the if statement, for example, information relating to the clip and information on angle numbers and the like, is described.

Here, although omitted in FIG. 14, in the block PlayItem( ), also, clip specification information and the like, such as IN_time (reproduction start point) and OUT_time (reproduction end point) which show the reproduction range of the clip AV stream, are recorded.

Further, for example, the information of field connection_condition which shows information relating to a connection state of the reproduction data in the reproduction process using the plurality of play items, block PlayItem_random_access_flag which prescribes whether or not random access is permitted with regard to the play items, block STN_table( ) which shows the attributes, PID number, recording position on the recording medium, and the like of the clip AV stream which is managed by the play items using the PlayItem( ) are recorded.

(B) Clip Information File

Next, the clip information file which is used as the reproduction control information of the multi-angle content and the EP map in the clip information file will be described with reference to FIG. 15 below. As simply described previously with reference to FIG. 12, the EP map has the correspondence information of the PTS (presentation time stamp) as the reproduction time of the angle change point and the SPN (source packet number) which shows the packet position.

Here, the EP map does not only register the PTS/SPN correspondence data with regard to the angle change point of the multi-angle content but also registers the PTS/SPN correspondence data with regard to the packet position where random access is possible.

The syntax of the clip information file is shown in FIG. 15. The clip information file is configured from six objects as shown in FIG. 15. These are ClipInfo( ) 221, SequenceInfo( ) 222, ProgramInfo 223, CPI( ) 224, ClipMark( ) 225, and MakersPrivateData( ) 226.

The ClipInfo( ) 221 records attribute information of the AV stream file corresponding to the clip information file.

The SequenceInfo( ) 222 Will be Described.

A time interval, where a discontinuity (discontinuity in a system time base) of the STC (System Time Clock (standard time)) is not included in the MPEG-2 transport stream, is referred to as STC_sequence and the STC_sequence is specified in the clip using the value of std_id. The same STC value in the same STC_sequence will definitely not appear. Accordingly, the same PTS (Presentation Time Stamp (time information for synchronous reproduction)) value in the same STC_sequence also will definitely not appear. In a case where N (N>0) STC discontinuities are included in the AV stream, the system time base of the clip is divided into (N+1) STC_sequences.

The SequenceInfo records the address of a location where STC discontinuities (discontinuities in the system time base) are generated.

The ProgramInfo( ) 223 will be described with reference to FIG. 16.

The ProgramInfo( ) records the address of a location where the program sequence (program_sequence) starts. SPN_program_sequence_start shows the address. The SPN is the source packet number.

Here, the program sequence (program_sequence) is a reproduction interval which is reproduced using the clip information file or a time interval and has the characteristics below.

The value of PCR_PID (Program Clock Reference Packet ID) does not change.

The number of video elementary streams does not change.

The encoding information, which is defined by the value of PID with regard to each of the video streams and the VideoCodingInfo thereof, does not change.

The number of audio elementary streams does not change.

The encoding information, which is defined by the value of PID with regard to each of the audio streams and the AudioCodingInfo thereof, does not change.

The program sequence (program_sequence) has only one system time base in the same timing and has only one PMT (Program Map Table) in the same timing.

FIG. 17 is a diagram illustrating the syntax of the ProgramInfo.

The num_of_program_sequences shows the number of the program sequence (program_sequence) in the clip information file.

The SPN_program_sequence_start [i] is a relative address of a location where the program sequence starts in the AV stream field.

The program_map_PID[i] shows a PID of the PMT which is valid in the program sequence (program_sequence). The num_of_streams_in_ps [i] shows the number of streams which are present in the program sequence (program_sequence).

The num_of_groups [i] shows the combined number of the streams when the program sequence (program_sequence) is reproduced.

Next, CPI (Characteristic Point Information) 224 in the syntax shown in FIG. 15 will be described. FIG. 18 is a diagram illustrating the syntax of the CPI.

The CPI records data for linking the time information in the AV stream and the address in the file. Specifically, the entry point map (EP map (EP_map)) 230 described previously with reference to FIG. 12 is recorded.

Figure 19:
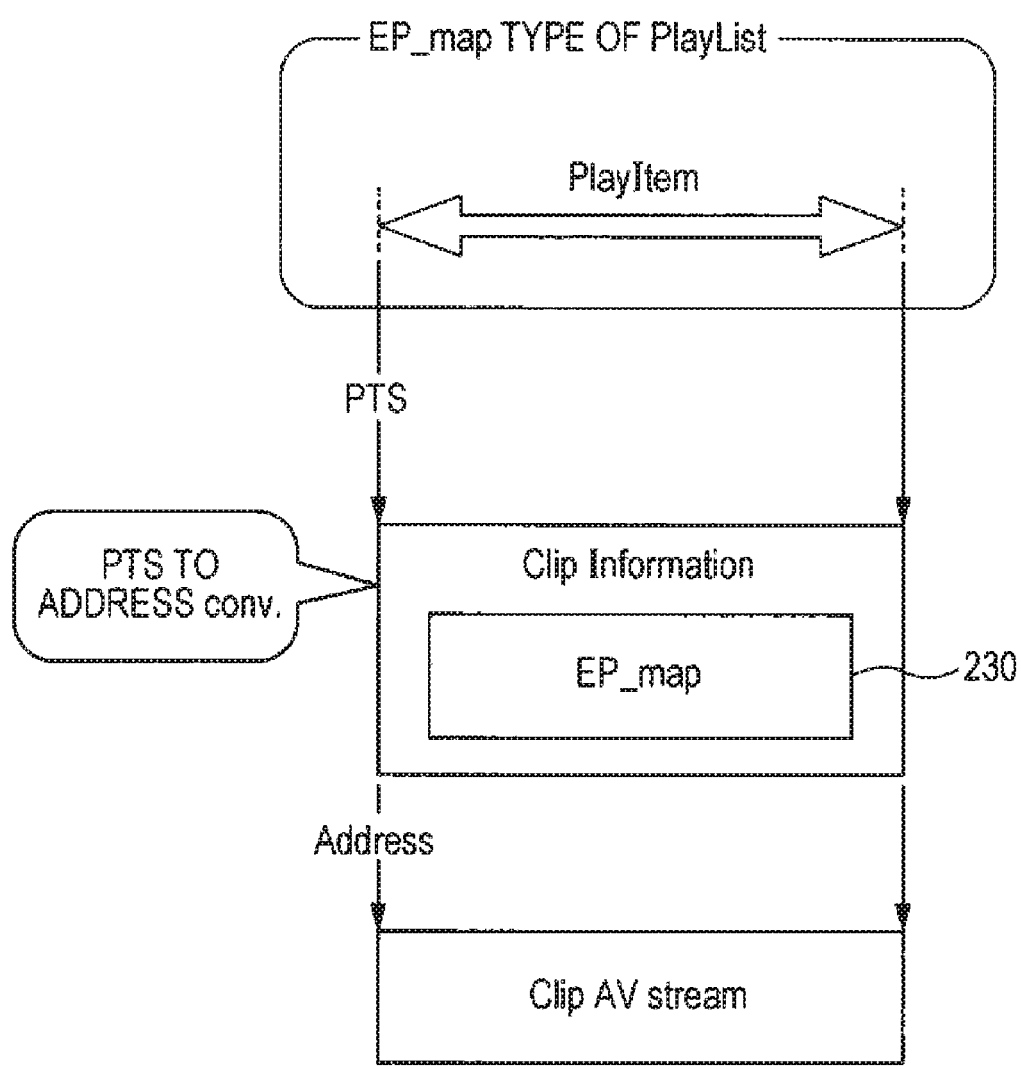
FIG. 19 is a diagram describing an EP map included in a clip information file.
Figure 20:
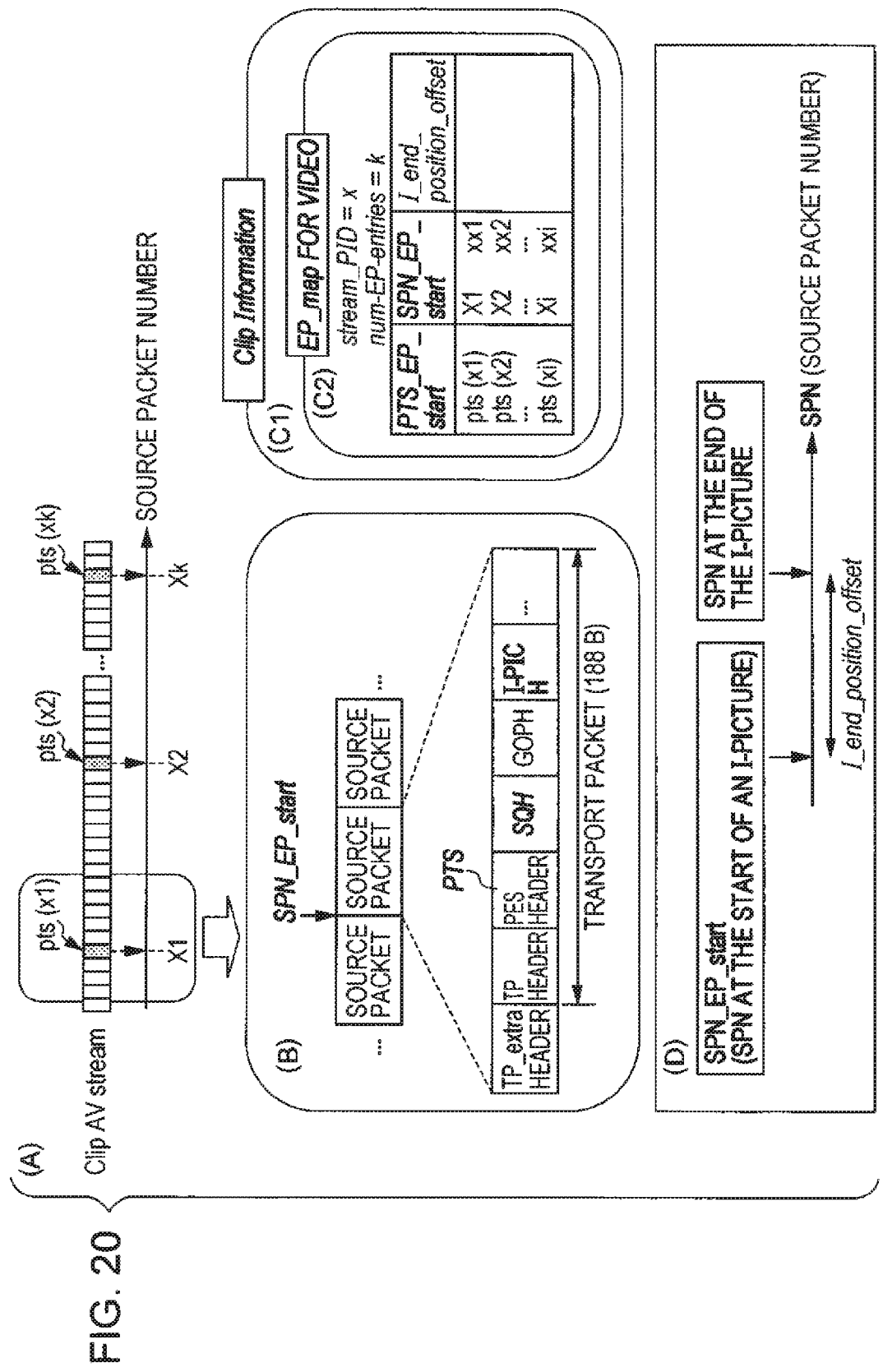
FIG. 20 is a diagram describing an EP map included in a clip information file.

The EP map 230 will be described with reference to FIGS. 19 and 20. As shown in FIG. 19, the EP map (EP_map) 230 is data which includes the clip information file. The EP map has, for example, detection information of the I picture position as standard data of the MPEG data which is a point (entry point) where it is possible to start random access. A detection process of the I picture position will be described with reference to FIG. 20. (A) of FIG. 20 shows the clip AV stream and each rectangle shows a 192-byte source packet. In each of the source packets, the time stamp is set and the reproduction processing time is prescribed.

The detailed configuration of the source packet No. (X1) is shown in (B) of FIG. 20. One source packet is configured by a TP_extra head and a transport packet, and the transport packet is configured by each type of head information (sequence head (SQH), GOP header (GOPH and the like), and the actual data of the MPEG data (I, B, and P pictures).

The EP map described previously is included in the clip information file shown in (C) of FIG. 20. In the EP map, each of the data of [PTS_EP start], [SPN_EP start], and [I_end_position_offset] are included as shown in the drawing. The meaning of each of the data is as below. The data relationship between PTS_EP start: time stamp (presentation time stamp) which corresponds to source packet which includes the sequence header, SPN_EP start: head address of the source packet which includes the sequence header, _end_position_offset: offset of the source packet, which includes the end of the I picture, from the source packet which includes the sequence header is shown in (D) of FIG. 20.

That is, the configuration of the data which is included the source packet is prescribed as shown in (B) of FIG. 20, and by determining each of the data of [PTS_EP start], [SPN_EP start], and [I_end_position_offset] shown in (C) of FIG. 20 from the EP map, it is possible to determine the I picture position in the source packet based on the data. It is possible for the reproduction device to execute the reproduction process from an arbitrary position by determining the I picture position from the EP map.

The reproduction device acquires the EP map from the clip information file which is specified by the play item of the switching destination according to, for example, the angle changing request from the user. Furthermore, the acquired EP map is referenced and the packet position (SPN) of the head packet of the angle change point in the clip information file of the angle changing destination is acquired. Furthermore, the packet at the angle change point is acquired from the clip information file in accordance with the acquired packet position information (SPN), and decryption and reproduction are executed. The packet of the angle change point is the packet where the head is set to the I picture of the closed GOP and decryption and reproduction are promptly performed without referencing of another GOP.

In this manner, the content which is the copy original (for example, MPEG-2 encoding data) is set as the data which has restrictions as below for being set so that it is possible to execute the angle changing process without any delay.

(A) The closed GOP head has the I picture set as the head picture of the packet of the angle change point of the clip AV stream file.

(B) The source packet number (SPN) which shows the packet position of the angle change point in the EP map of the clip information file is registered to correspond to the reproduction time information (PTS: presentation time stamp).

5. Copying Process Accompanying Data Conversion Process (Transcoder) Executed in Information Processing Device of Embodiment of Disclosure The information processing device of an embodiment of the disclosure performs data conversion where there is no loss of reproduction processing functions of the content which is the copy original in the data conversion process (transcoder) which is executed at a time of content copying process and it is possible to execute the reproduction process in the same manner as the copy original content even at a time of the reproduction process of the copy content.

Specifically, for example, data conversion is executed where the restrictions (A) and (B) described above are maintained, and in a case where the copy content is reproduced from the second medium which is the copy destination, angle changing is possible in the same manner as the reproduction of the original content from the first medium which is the copy original.

The details of the content copying process which is executed by the information processing device of an embodiment of the disclosure will be described with reference to FIG. 21 below.

Figure 21:
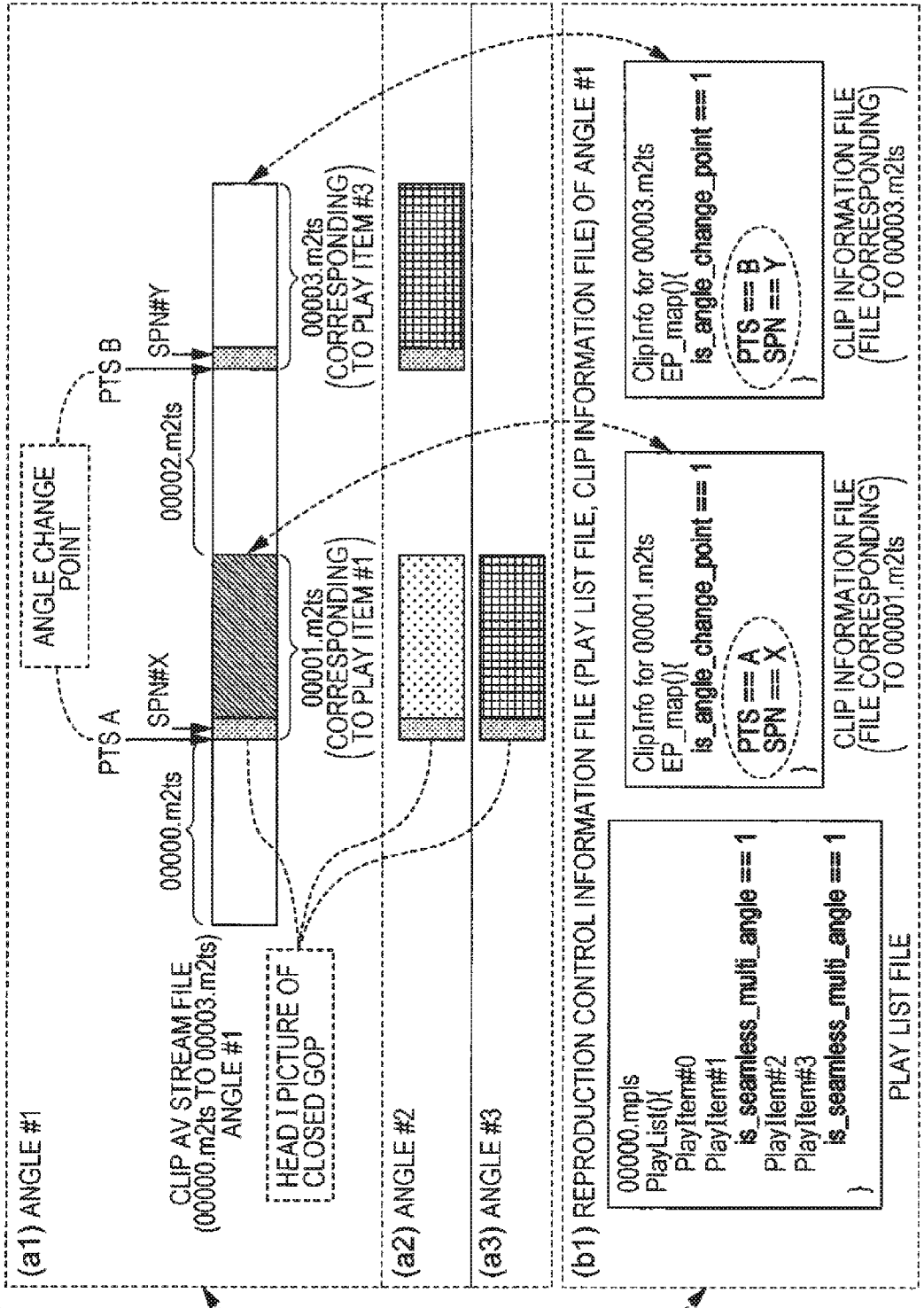
FIG. 21 is a diagram describing details of a content copying process executed in an information processing device according to an embodiment of the disclosure.

FIG. 21 is a diagram which describes the correspondence relationship of the clip AV stream file of the multi-angle content which is the copy original, the play list file as the control information file, and the clip information file.

In FIG. 21, each of the data below is shown (a1) a portion of the clip AV stream file #1 which corresponds to the angle #1

(a2) a portion of the clip AV stream file #2 which corresponds to the angle #2

(a3) a portion of the clip AV stream file #3 which corresponds to the angle #3

(b1) the play list file as the reproduction control information file which corresponds to the clip AV stream file #1 which corresponds to the angle #1 in (a1) above and the clip information file (including the EP map).

The clip AV stream file #1 which corresponds to the angle #1 shown in (a1) has the stream data (00000.m2ts to 00003.m2ts) which corresponds to a plurality of play items.

Each of the clip AV stream data (00000.m2ts to 00003.m2ts) is stream data which is specified using the play items #0 to #3 recorded in the play list file shown in (b1).

The clip information file which corresponds to the clip AV stream data (00000.m2ts to 00003.m2ts) is selected using the play items #0 to #3 recorded in the play list file shown in (b1), and further, the clip AV stream data (00000.m2ts to 00003.m2ts) which corresponds to the clip information file is acquired and reproduced.

In the diagram of (b1), the clip information files, which correspond to the two stream data (00001.m2ts, 00003.m2ts) shown in (a1), are shown.

The two stream data (00001.m2ts, 00003.m2ts) is the data which corresponds to multi-angle.

It is possible to determine whether there is the data which corresponds to multi-angle by referencing the flag settings of the play item information of the play list file (is_seamless_multi_angle) or the information which is included in the EP map of the clip information file (is_angle_change_point). In a case where the flag settings are one, the data acquired using the play item or the data acquired using the data which corresponds to the PTS/SPN of the EP map of the clip information file is the data which corresponds to multi-angle. In a case where the flag settings are zero, there is no data which corresponds to multi-angle.

In the example shown in FIG. 21, the two stream data (00001.m2ts, 00003.m2ts) is the data which corresponds to multi-angle.

In the data reproduction interval, the stream data of the total of three angles of the angle #2 of (a2) and the angle #3 of (a3) shown in the diagram as well as the angle #1 is set and it is possible for the user to select and reproduce arbitrary angle data from the 3z angle of the angles #1 to #3.

Here, in FIG. 21, only the control information file which corresponds to the angle #1 is shown in (b1), but there is also the control information file (play list file and clip information file) which corresponds to the stream data of the angle #2 of (a2) and the stream data of the angle #3 of (a3).

In a case where the stream data of the angle #2 of (a2) is reproduced, the play list file which has a correspondence with the stream data of the angle #2 and the clip information file are used and reproduction is executed.

In a case where the stream data of the angle #3 of (a3) is reproduced, the play list file which has a correspondence with the stream data of the angle #3 and the clip information file are used and reproduction is executed.

In a case where the stream data of the angle #1 of (a1) is reproduced, the play list file which has a correspondence with the stream data of the angle #1 and the clip information file, that is, the play list file and the clip information file shown in (b1) of FIG. 21, are used and reproduction is executed.

For example, at a time when the stream data 00001.m2ts shown in (a1) of FIG. 21 is reproduced, the clip information file (ClipInfo for 00001.m2ts) shown in the center of (b1) of FIG. 21 is acquired in accordance with the clip specification information which is recorded in the play item information (PlayItem #1) recorded in the play list file shown in (b1) of FIG. 21, the EP map of the clip information file is referenced, the PTS as the reproduction time information and the SPN which shows the packet position are acquired, the acquiring of the packet from the clip AV stream is performed in accordance with the SPN, and the reproduction process of the angle #1 is executed.

In the example shown in the diagram, the Xth packet from the head of the stream file is acquired and reproduced in accordance with the SPN #X.

At a time when the stream data 00003.m2ts shown in (a1) of FIG. 21 is reproduced, the clip information file (ClipInfo for 00003.m2ts) shown in the right edge of (b1) of FIG. 21 is acquired in accordance with the clip specification information which is recorded in the play item information (PlayItem #3) recorded in the play list file shown in (b1) of FIG. 21, the EP map of the clip information file is referenced, the PTS as the reproduction time information and the SPN which shows the packet position are acquired, the acquiring of the packet from the clip AV stream is performed in accordance with the SPN, and the reproduction process of the angle #1 is executed.

In the example shown in the diagram, the Yth packet from the head of the stream file is acquired and reproduced in accordance with the SPN #Y.

Here, the packet acquired according to the SPN #X and the SPN #Y includes the closed GOP where the I picture is set as the head picture, and using decryption of the closed GOP, decryption and reproduction are promptly realized without referencing of another GOP.

The content which is recorded on the first medium which is the copy original has the setting which satisfies the restrictions below as described with reference to FIG. 21.

(A) The closed GOP has the I picture set as the picture of the packet of the angle change point of the clip AV stream file.

(B) The source packet number (SPN) which shows the packet position of the angle change point in the EP map of the clip information file is registered to correspond to the reproduction time info/citation (PTS: presentation time stamp).

However, when the data conversion section (transcoder) executes the conversion process in a case where the data is copied with regard to the second medium, there is a possibility that the restrictions are not maintained.

Figure 22:
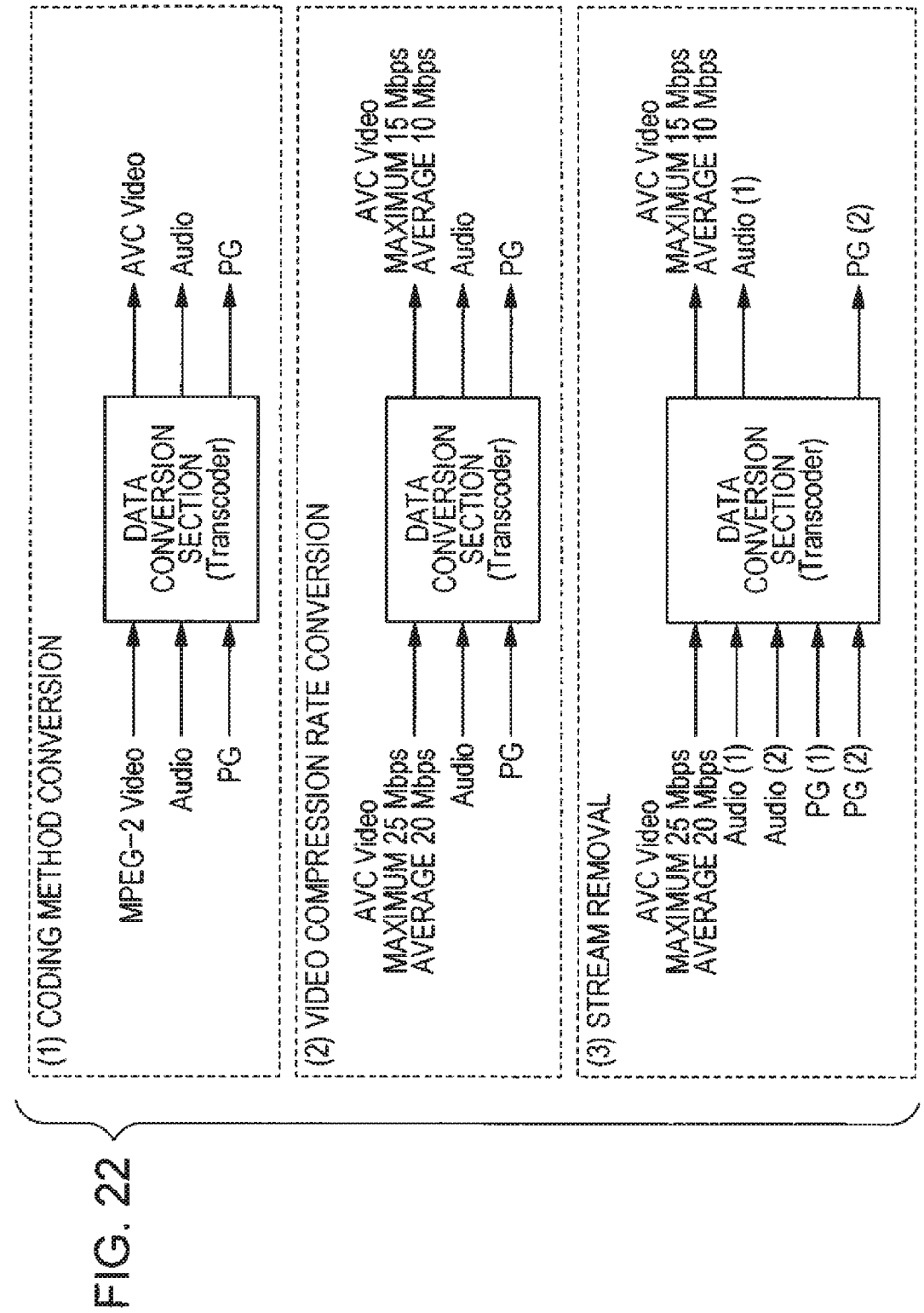
FIG. 22 is a diagram describing a data conversion process example executed in an information processing device according to an embodiment of the disclosure.

Here, as the form of the data conversion process which is executed by the data conversion section (transcoder), there are the forms below as shown in FIG. 22. There are the forms of (1) coding method conversion (2) video compression rate conversion (3) stream removal.

The encoding method conversion of (1) is equivalent to a case where, for example, the encoding format of the copy original data which is stored in the first medium is MPEG-2 and the encoding format of the data which is recorded on the second medium which is the copy destination is a different encoding format such as AVCHD.

Here, in the diagram, Video is video stream, the Audio is audio stream, and PG is, for example, presentation graphics data stream such as subtitle data.

The video compression rate conversion of (2) is an example where, for example, the encoding format of the copy original data which is stored on the first medium is also the same as the encoding format of the data which is recorded on the second medium which is the copy destination, and while both are, for example, AVCHD format, the compression rates change.

Specifically, in regard to the data which is configured by the video stream data where the copy original data has a maximum of 25 Mbps and an average of 20 Mbps, the setting of the copy destination data is lower to a maximum of 15 Mbps and an average of 10 Mbps. The process is equivalent to a process where, for example, copy data where image quality is slightly lowered is generated and recording is performed.

The stream removal of (3) is a process where stream which is not the copy target is removed.

For example, as shown in (3) of FIG. 22, the copy original data which is stored in the first medium is configured by the stream data of one video stream (Video), two audio streams (Audio(1), Audio(2)), two presentation graphics streams (PG (1), PG(2)).

On the other hand, the data recorded on the second medium which is the copy destination is only one video stream (Video), one audio stream Audio(1)), one presentation graphics stream (PG(2)).

The stream removal of (3) is a process where the other streams (Audio(2) and PG(1)) are not set as the copy target and are removed.

As the data conversion process which is executed by the data conversion section (transcoder) at a time of the copying process, there are the forms of (1) encoding method conversion, (2) video compression rate conversion, and (3) stream removal as shown in FIG. 22. Here, there may be a case where each of the process of (1) to (3) are arbitrarily combined.

When data conversion such as this is executed, the data packet configuration of the copy original data and the copy destination data differ.

Figure 23:
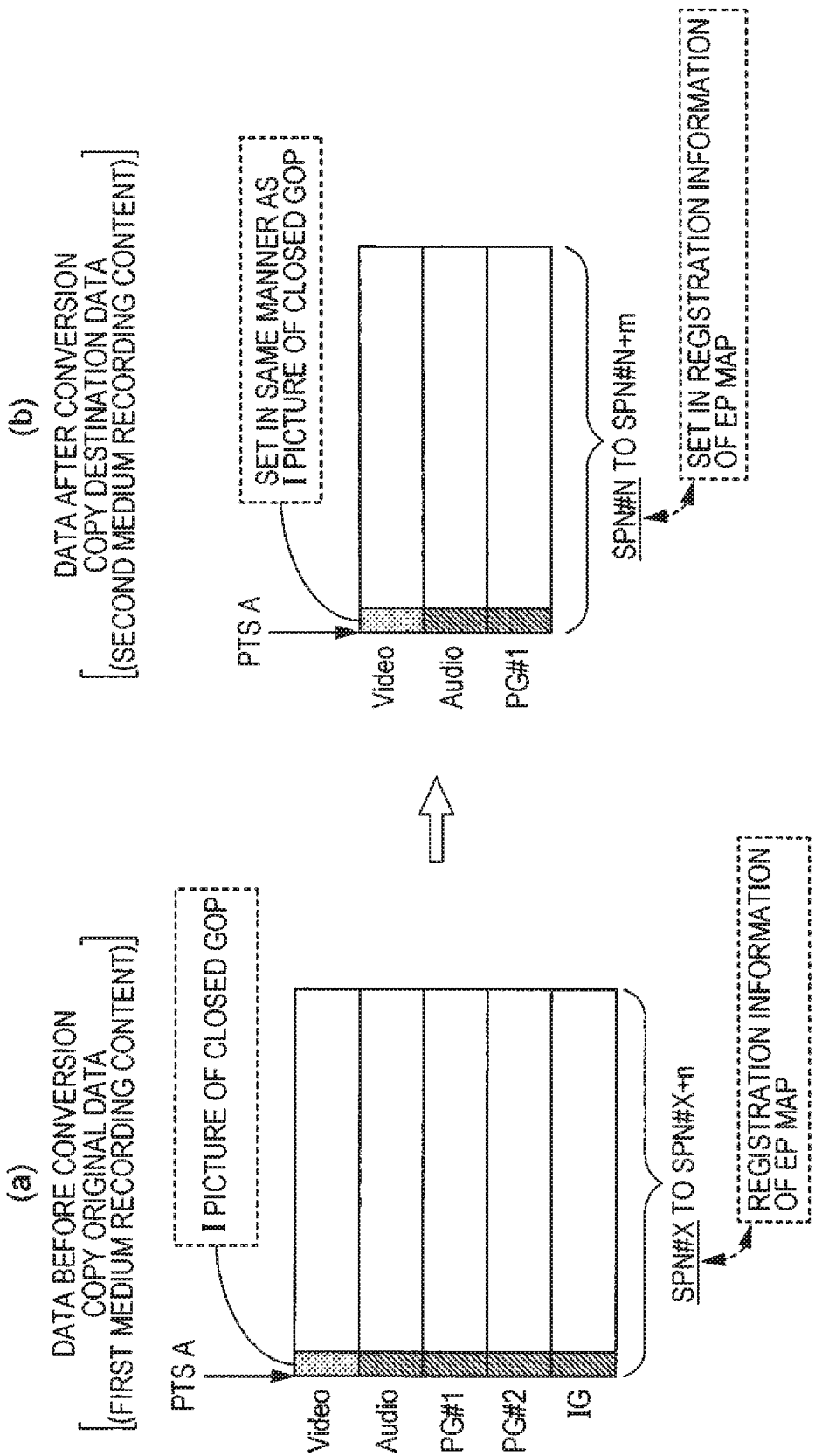
FIG. 23 is a diagram describing a data conversion process example executed in an information processing device according to an embodiment of the disclosure.

A specific example will be described with reference to FIG. 23. FIG. 23 shows the two data examples below.

(a) data before conversion (copy original data (first medium recording content))

(b) data after conversion (copy destination data (second medium recording content))

Here, the data of (a) before conversion (copy original data (first medium recording content)) shown in (a) of FIG. 23 corresponds to, for example, the detailed configuration of the stream data (00001.m2ts) in the clip AV stream #1 of the multi-angle content shown in FIG. 21.

The result of the conversion at a time of the copying process of the stream data (00001.m2ts) is the data of (b) after conversion (copy destination data (second medium recording content)) and is equivalent to the data recorded as the copy data in the second medium.

The data of (a) before conversion (copy original data (first medium recording content)) is configured by the stream data of one video stream (Video), one audio stream (Audio) two presentation graphics streams (PG#1, PG#2), one interactive graphic (IG).

Here, the interactive graphic (IG) is, for example, graphics data for the display of a switch, a button, or the like which provide a user interface.

On the other hand, the data of (b) after conversion (copy destination data (second medium recording content)) shown in (b) of FIG. 23 is configured by the stream data of one video stream (Video), one audio stream (Audio), one presentation graphics stream (PG#1).

Here, there are cases where the encoding formats of the data of (a) before conversion and the data of (b) after conversion are different.

Since the data structure of the data of (a) before conversion and the data of (b) after conversion are different, the number of packets is also different.

In the example shown in the diagram, the data of (a) before conversion is configured by n packets where the source packet numbers (SPN) are SPN #X to #X+n.

On the other hand, the data of (b) after conversion is configured by m packets where the source packet numbers (SPN) are SPN #N to #N+m.

The change of the packet configuration is generated in all of the data and not just the stream data (00001.m2ts) in the clip AV stream #1 shown in (a) of FIG. 21.

Accordingly, the source packet numbers at the head of the angle change point change. In the example of FIG. 23, there is a change from SPN #X to SPN #N.

The source packet number (SPN=#X) of the angle change point of the data (a) before conversion is the SPN which is registered in the EP map as described previously.

When the packet configuration is changed due to the data conversion, the SPN of the angle change point of the data of (b) after conversion changes to SPN=#N in the example shown in FIG. 23. Accordingly, when the SPN=#X which is registered in the EP map is applied as it is, a packet is acquired in a position which is completely different from the SPN=#N of the angle change point of the data of (b) after conversion.

In addition, the packet of the angle change point of the data of (a) before conversion is set as the packet which has the closed GOP which includes the I picture as the head picture. Here, the packet configuration is a packet which includes the sequence header (SQH) and the GOP header (GOPH) as described previously with reference to (B) of FIG. 20, and further, is configured by the closed GOP which includes the head I picture and the like.

The packet setting such as this is not limited to necessarily being maintained using the data conversion which is executed at a time of the copying process.

When the setting of the closed GOP is executed, there is a concern that it is not possible to smoothly execute angle changing without having to execute a process of referencing another GOP picture during the image reproduction of the angle change point.

The information processing device of an embodiment of the disclosure executes the data conversion process which prevents the occurrence of such a phenomenon.

A setting example of the data stream (clip AV stream file) generated by the data conversion which is executed by the information processing device of an embodiment of the disclosure and the control information file (play list file, clip information file) will be described with reference to FIG. 24.

Figure 24:
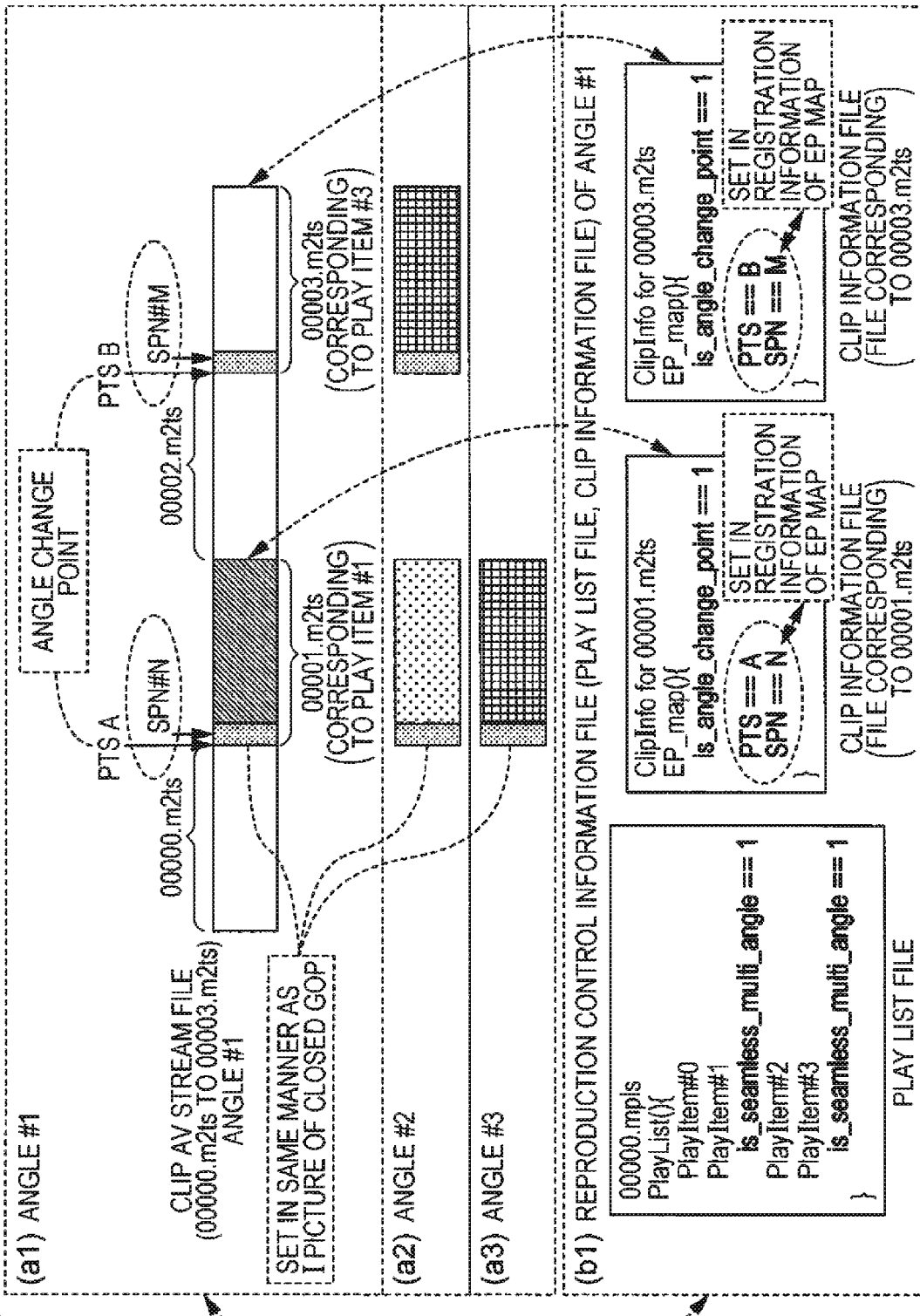
FIG. 24 is a diagram describing details of a content copying process executed in an information processing device according to an embodiment of the disclosure.

Each of the data below is shown in FIG. 24 in the same manner as FIG. 21.

The data of (a1) a portion of the clip AV stream file #1 which corresponds to the angle #1 (a2) a portion of the clip AV stream file #2 which corresponds to the angle #2 (a3) a portion of the clip AV stream file #3 which corresponds to the angle #3 (b1) the play list file as the reproduction control information file which corresponds to the clip AV stream file #1 which corresponds to the angle #1 in (a1) above and the clip information file (including the EP map) is the data after conversion (copy destination data) after the conversion process is executed in the data conversion section (transcoder) with regard to the data before conversion (copy original data) shown in FIG. 21.

The clip AV stream file #1 which corresponds to the angle #1 shown in (a1) has the stream data (00000.m2ts to 00003.m2ts) which corresponds to a plurality of play items.

Each of the clip AV stream data (00000.m2ts to 00003.m2ts) is stream data which is specified using the play items #0 to #3 recorded in the play list file shown in (b1).

The clip information file which corresponds to the clip AV stream data (00000.m2ts to 00003.m2ts) is selected using the play items #0 to #3 recorded in the play list file shown in (b1), and further, the clip AV stream data (00000.m2ts to 00003.m2ts) which corresponds to the clip information file is acquired and reproduced.

In the diagram of (b1), the clip information files, which correspond to the two stream data (00001.m2ts, 00003.m2ts) shown in (a1), are shown.

The two stream data (00001.m2ts, 00003.m2ts) is the data which corresponds to multi-angle.

It is possible to determine whether there is the data which corresponds to multi-angle by referencing the flag settings of the play item information of the play list file (is_seamless_multi_angle) or the information which is included in the EP map of the clip information file (is_angle_change_point). In a case where the flag settings are one, the data acquired using the play item or the data acquired using the data which corresponds to the PTS/SPN of the EP map of the clip information file is the data which corresponds to multi-angle. In a case where the flag settings are zero, there is no data which corresponds to multi-angle.

In the example shown in FIG. 21, the two stream data (00001.m2ts, 00003.m2ts) is the data which corresponds to multi-angle.

In the data reproduction interval, the stream data of the total of three angles of the angle #2 of (a2) and the angle #3 of (a3) shown in the diagram as well as the angle #1 is set and it is possible for the user to select and reproduce arbitrary angle data from the 3z angle of the angles #1 to #3.

Here, in FIG. 24, only the control information file which corresponds to the angle #1 is shown in (b1) in the same manner as FIG. 21, but there is also the control information file (play list file and clip information file) which corresponds to the stream data of the angle #2 of (a2) and the stream data of the angle #3 of (a3).

In a case where the stream data of the angle #2 of (a2) is reproduced, the play list file which has a correspondence with the stream data of the angle #2 and the clip information file are used and reproduction is executed.

In a case where the stream data of the angle #3 of (a3) is reproduced, the play list file which has a correspondence with the stream data of the angle #3 and the clip information file are used and reproduction is executed.

In a case where the stream data of the angle #1 of (a1) is reproduced, the play list file which has a correspondence with the stream data of the angle #1 and the clip information file, that is, the play list file and the clip information file shown in (b1) of FIG. 24, are used and reproduction is executed.

The settings are the same as the data setting before conversion shown in FIG. 21.

Since it is possible to smoothly execute angle changing also after the conversion process, the information processing device executes the process where the registration information of the EP map of the clip information file is changed to the source packet number (SPN) of the angle change point.

For example, the head packet number of the stream data 00001.m2ts which is the multi-angle content shown in (a1) of FIG. 24 changes from the setting of SPN=#X shown in FIG. 21 to SPN=#N.

Along with changing of the SPN of the head packet of the stream data 00001.m2ts, the data processing section of the information processing device of an embodiment of the disclosure changes the registration information of the EP map of the clip information file which corresponds to the stream data 00001.m2ts.

The data processing section of the information processing device of an embodiment of the disclosure executes an updating process of the reproduction control information file where the position information of the packet which corresponds to the angle change point is acquired based on the conversion data which is generated by the data conversion section, and the angle change point position information of the data before conversion, which is recorded in the EP map of the reproduction control information file (clip information file) which is included in the copy target data, is updated with the angle change point position information of the data after conversion. That is, a process is performed where the SPN=X, which is the registration information of the EP map which is recorded in the clip information file shown in the center of (b1) of FIG. 24, is rewritten as SPN=N.

Here, the PTS (presentation time stamp) which is the reproduction time information is the same before conversion and after conversion of the data and does not change.

Here, the source packet number (SPN) of the angle change point may be calculated by counting the number of packets from the head packet of the configuration data of the clip AV stream after conversion or may be calculated based on the number of bytes from the head of the configuration data of the clip AV stream after conversion. One packet is 192 bytes and it is possible to calculate the number of preceding packets by subtracting the number of bytes from the head of the AV stream file to the angle change point from 192 bytes, and the packet number (SPN) of the angle change point is the number of preceding packets plus one.

The information processing device of an embodiment of the disclosure performs a process where the packet of the GOP which is set by the angle change point is made to be data equivalent to the closed GOP with the head as the I picture.

That is, it is set so that decryption and reproduction of a series of moving images is possible using the referencing of only the collection of specific pictures.

The concept of the GOP is a concept is in the MPEG-2 format but not, for example, in the MPEG-4AVC or the AVCHD formats.

For example, in the AVC format including the MPEG-4AVC or the AVCHD formats, an IDR (Instantaneous Decoder Refresh) picture which has the same setting as the head I picture of the closed GOP is prescribed.

The IDR picture is a picture where it is possible to execute the decryption of all of the pictures after the IDR picture without referencing the pictures before the IDR picture. That is, in a case where the IDR picture is the reproduction start picture, it is possible to execute decryption and reproduction without referencing the pictures before the IDR picture.

In a case where, for example, the copy original data is the MPEG-2 format data and the copy data after conversion is AVC format data such as the MPEG-4AVC or the AVCHD format, the data conversion section of the information processing device of an embodiment of the disclosure sets the head I picture of the closed GOP which is the packet of the angle change point as the IDR picture in the AVC format and the encoding process is performed.

By performing the process such as this, in a case where reproduction from the angle change point is performed, it is possible to perform accurate decryption and reproduction processes of the images of the IDR picture and after using only the pictures of the IDP picture and after with the IDR picture which is set in the angle change point as the reproduction start picture.

That is, the process where the IDR picture in the AVC format is the reproduction start picture is possible to be performed as the same process where decryption and reproduction are executed with the head I picture of the closed GOP in the MPEG-2 format as the reproduction start point.

Here, in a case where the data conversion process which is not accompanied by a change in encoding format, for example, the MPEG-2 format, is maintained, and the video compression rate conversion of (2) or the stream removal of (3) which are described with reference to FIG. 22 is executed, the data conversion is executed with the setting of the closed GOP which has the head I picture of the angle change point not being changed before and after conversion and being maintained as it is.

In the same manner, for example, in a case where the original data which is recorded on the first medium which is the copy target is the AVC format data such as the MPEG-4AVC and the AVCHD formats, the format is maintained, and the video compression rate conversion of (2) or the stream removal of (3) which are described with reference to FIG. 22 is executed, the data conversion is executed with the setting of the IDR picture of the angle change point not being changed before and after conversion and the setting of the IDR picture being maintained as it is.

By executing the data conversion such as this, it is possible to smoothly perform reproduction from the head picture of the angle change point even at a time of the reproduction of the copy data from the second medium which is the copy destination.

6. Copying Process Sequence Executed in Information Processing Device of Embodiment of Disclosure Next, the copying process sequence which is executed by the information processing device of an embodiment of the disclosure will be described with reference to the flow chart shown in FIG. 25 below.

Figure 25:
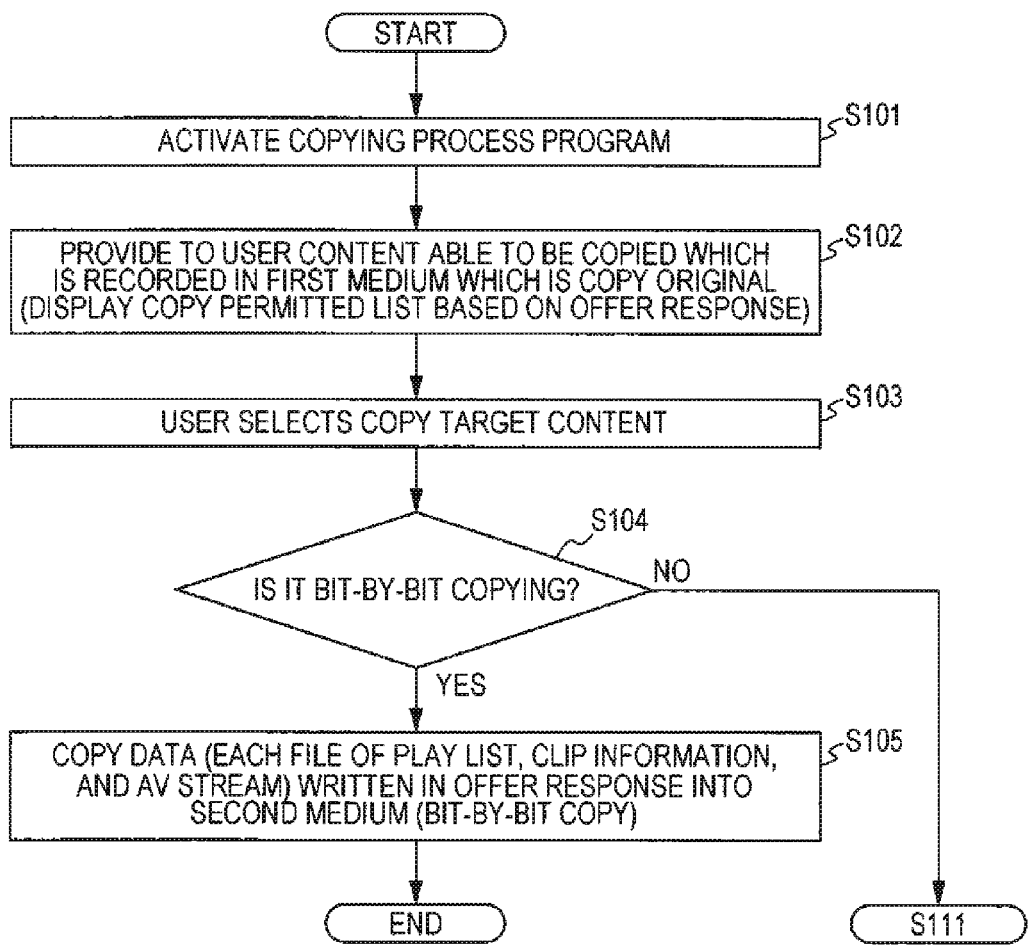
FIG. 25 is a flow chart describing a copying process sequence executed in an information processing device according to an embodiment of the disclosure.

The process starting from step S101 in FIG. 25 will be described. Here, the processes of each step shown in the flow are executed in the data processing section or the data conversion section (transcoder) of the information processing device. Mainly, the data processing section performs analysis of the data which is the conversion target, and according to the analysis result, the data conversion section (transcoder) executes the data conversion process.

First, in step S101, the copying process program which is stored in advance in the information processing device is activated.

Here, the copying process is performed as a Managed Copy (MC) process which is executed under server management described previously with reference to FIG. 4.

In step S102, the content able to be copied, which is recorded on the first medium which stores the copy original content, is displayed to the user. The display process is performed using a display section (display) of the information processing device.

The process is equivalent to a process where the response information (Offer Response) 131 from the management server 140 described previously with reference to FIGS. 4 and 7 is applied and a catalogue list (the copy permitted list 121) of the copy permitted content is displayed on the display section of the information processing device. In the list, the prices and the like are set for a case where, for example, copying of each item of the content is executed.

In step S103, the content which is the copy target is selected from the display list.

In step S104, it is decided whether or not to perform bit-by-bit copying where the recording data of the first medium is copied as it is, that is, the copying process which is not accompanied by data conversion (transcoding). This decision may be executed based on the input of the user or may be determined in accordance with information which is prescribed in advance in the device.

In a case where bit-by-bit copying which is not accompanied by data conversion is executed, the process progresses to step S105, and a process is performed where each file of the play list file (PlayList) which is the copy target, the clip information file (ClipInfo) which is specified from the selected play list, and the clip AV stream file (m2ts) is read out from the first medium in accordance with the name of the play list file which is written in the response information (Offer Response) received from the server (refer to FIG. 7) and copy recorded on the second medium.

Figure 26:
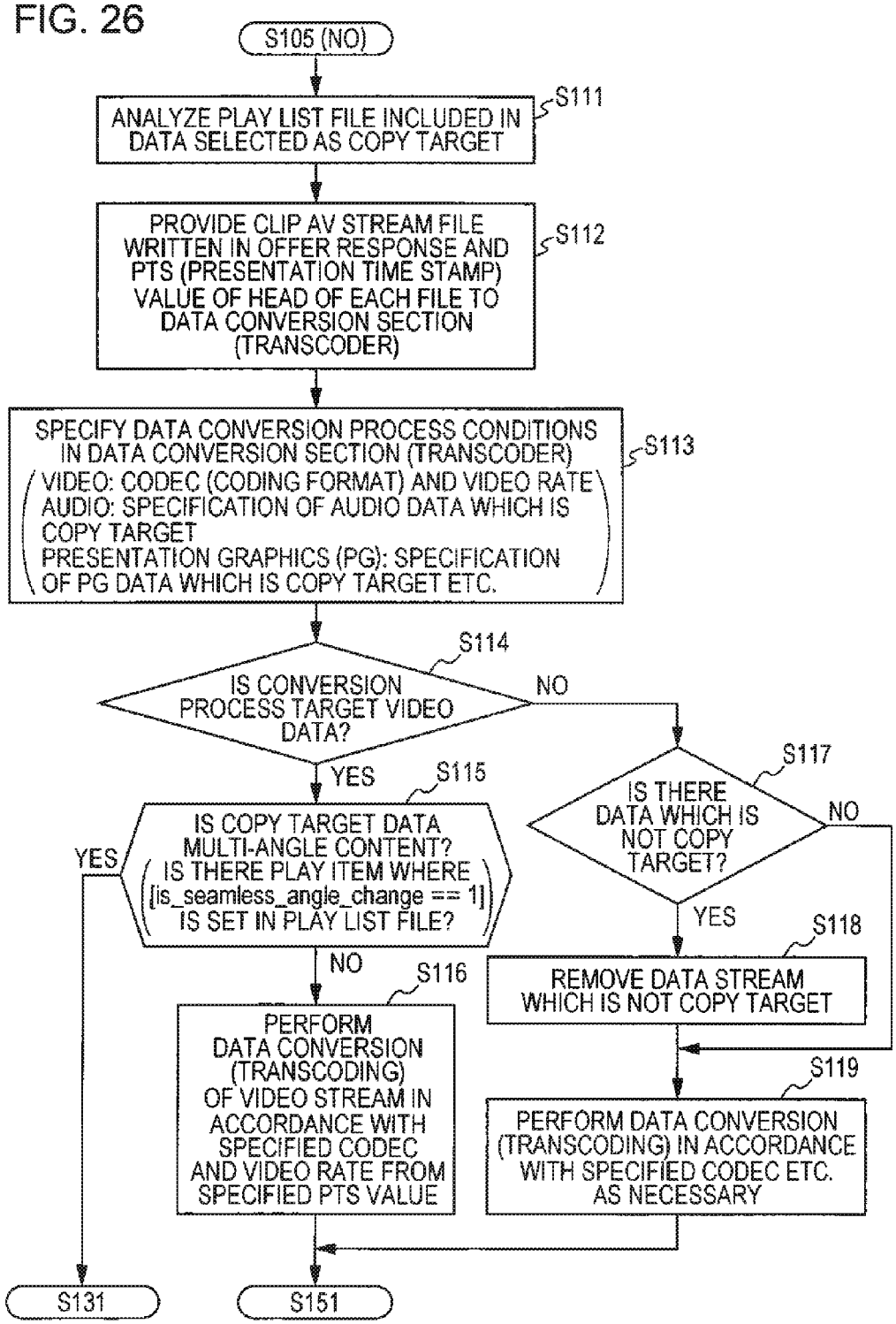
FIG. 26 is a flow chart describing a copying process sequence executed in an information processing device according to an embodiment of the disclosure.

On the other hand, the process progresses to step S111 of FIG. 26 in a case where it is determined in step S104 that the copying process which is accompanied by data conversion (transcoding), and not the bit-by-bit copying where the recording data of the first medium is copied as it is, is to be performed.

In step S111, the play list file which is included in the copy target data selected by the user is analyzed. Here, in a case where there are a plurality of play list files included in the copy target data, the process of step S111 below is sequentially executed for each of the play list files.

In step S112, the clip information file which is specified from the play list file (PlayList) which is the copy target and the clip AV stream file which is the reproduction data are acquired in accordance with the name of the play list file which is written in the response information (Offer Response) received from the server (refer to FIG. 7), and the initial PTS (presentation time stamp) of the clip AV stream is acquired and provided to the data conversion section (transcoder).

Next, in step S113, the data conversion process conditions of the data conversion section (transcoder) are specified. Specifically, for example, the conditions below and the like are specified.

The specifications of video: codec (coding format) and video rate audio: specification of audio data which is the copy target presentation graphics (PG): specification of the PG data which is the copy target are performed.

Here, the specifications may be executed by the input of the user or may use default specification conditions prescribed in advance in the information processing device.

Here, the data conversion process which is executed by the data conversion section (transcoder) is executed as any of or a combination of the process of (1) coding method conversion
(2) video compression rate conversion
(3) stream removal.

as described previously with reference to FIG. 22.

In step S114, the data which is the data conversion process target is sequentially selected and it is determined whether or not the data which is the conversion process target is video data. Here, the data conversion section (transcoder) executes the data conversion in predetermined data segments. In the conversion processing target data, video data, audio data, PG (presentation graphics) data such as subtitles or the like, and the like are included.

In a case where the conversion process target is video data, the process progresses to step S115.

In step S115, it is determined whether or not the video data which is the conversion process target is multi-angle content. The determination process is executed by referencing, for example, the play item information of the play list file or the clip information file.

It is determined by referencing the flag (is_seamless_multi_angle) which is set in a flag multi-angle content indentifying field in the play item information of the play list file which is described previously with reference to FIG. 14 and (b1) of FIG. 21. If (is_seamless_multi_angle==1), the content specified in the play item is multi-angle content.

The process progresses to step S131 when it is determined that the video data which is the conversion target is multi-angle content.

On the other hand, the process progresses to step S116 when it is determined that the video data which is the conversion target is not multi-angle content.

In step S116, the data conversion section executes the data conversion process (transcoding) under the specified encoding conditions in accordance with information such as the codec (coding form) decided in step S113 from the head of the data stream specified using the value of PTS which is previously provided from the data processing section in step S112. The data conversion process is a data conversion process with regard to video data which is not multi-angle content. After the encoding process, the process progresses to step S151.

On the other hand, in a case where it is determined in step S114 that the conversion process target is not video data, the process progresses to step S117. For example, there are cases of the data conversion process with regard to the audio data or the PG data.

In step S117, it is determined whether or not there is data which is not the copy target. For example, in a case where data such as Japanese or English is included as the audio data and the user selects only the Japanese as the copy target, the English audio data becomes data which is not the copy target.

In a case where it is determined in step S117 that there is data which is not the copy target, removal of the data which is not the copy target is performed in step S118. Furthermore, in step S119, the data conversion process of only the copy target data is executed as necessary and the process progresses to step S151.

Figure 27:
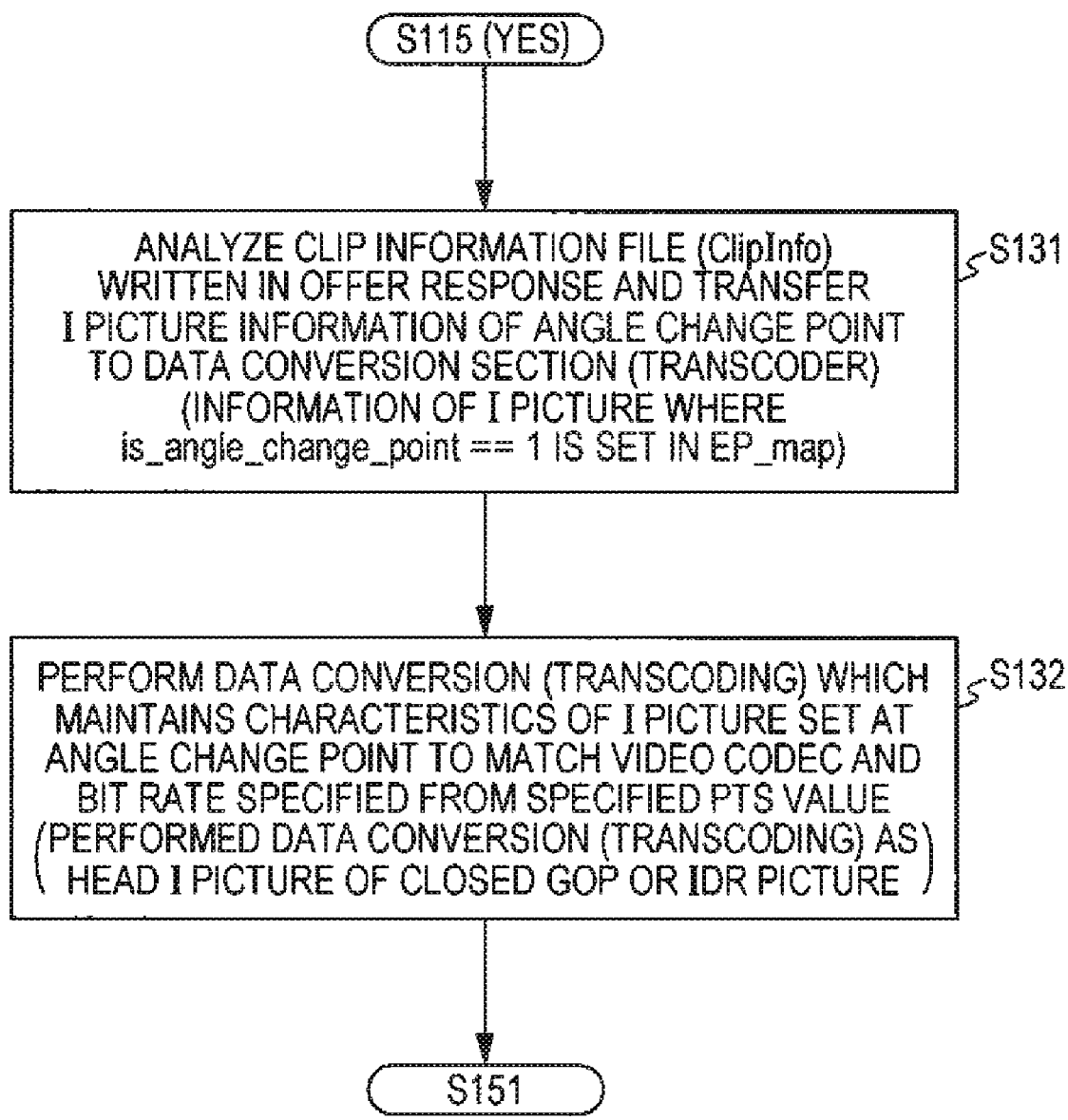
FIG. 27 is a flow chart describing a copying process sequence executed in an information processing device according to an embodiment of the disclosure.

Next, a process in a case where it is determined in step S115 that the video data which is the conversion target is multi-angle content, that is, the process of steps S131 and beyond, will be described with reference to the flow chart shown in FIG. 27.

In step S131, the data processing section analyzes the clip information file (ClipInfo) which is specified from the play list file (PlayList) which is the copy target which is written in the response information (Offer Response) received from the server (refer to FIG. 7) and the I picture information of the angle change point is provided to the data conversion section (transcoder).

The I picture information of the angle change point which is provided to the data conversion section (transcoder) is registration information of the EP map of the clip information file (ClipInfo).

In the EP map, the corresponding data of the time stamp (PTS: presentation time stamp) as the reproduction time information which is packet position information where random access is possible and the source packet number (SPN) which shows the packet position are registered as shown in, for example, the clip information file in the center of (b) of FIG. 21.

Furthermore, in a case of the registration information of the angle change point, the flag [is_angle_change_point==1] which shows that there is the angle change point is set.

The data processing section acquires the registration information (PTS/SPN) data, which is set by the flag [is_angle_change_point==1] which shows that there is the angle change point, from the registration information of the EP map and outputs the acquired information to the data conversion section (transcoder).

In step S132, there is a process by the data conversion section (transcoder). In step S132, the data conversion section executes the data conversion in accordance with the information where the video stream of the multi-angle content which is the data conversion target is decided in steps S112 and S113.

The data conversion is executed without breaking down the state of the closed GOP with the head I picture in the angle change point at a time of the data conversion process.

After the data conversion, the process progresses to step S151.

Here, the data conversion process in step S132 is a process which differs due to the executed conversion form. Specifically, the process of any of the below is performed.

(1) In a case where the MPEG-2 encoding data is converted to the AVC encoding data, data conversion is performed so that the head I picture of the closed GOP in the MPEG-2 encoding data is made to be the IDR picture in the AVC encoding data.

(2) In a case where the MPEG-2 encoding data is converted to the MPEG-2 encoding data (for example, changing the compression rate or the like), data conversion is performed so that the head I picture of the closed GOP is made to be the head I picture of the closed GOP as it is.

(3) In a case where the AVC encoding data is converted to the AVC encoding data (for example, changing the compression rate or the like), data conversion is performed so that IDR picture is made to be the IDR picture as it is.

That is, the data conversion (transcoding) is performed so that the picture of the angle change point is the head I picture of the closed GOP or the IDR picture.

In this manner, by setting the picture of the angle change point as the I picture of the closed GOP or the IDR picture, it is possible to execute complete decryption and reproduction by referencing only the data of the acquired picture and after at a time of the data reproduction from the angle change point.

Next, the process of steps S151 and below will be described with reference to FIG. 28.

The process of step S151 is executed after the completion of the conversion process of the video stream and the audio stream selected as the copy target.

In step S151, a reconfiguration process (such as a multiplexing process) of the clip AV stream, which is formed from only the copy target data excluding removed data, is executed.

That is, the AV stream which is formed from only the data selected as the copy target is re-set.

In step S152, re-setting of the GOP as the encoding and decryption MPEG segment, and re-setting of the source packet number (SPN), and the like are executed. The source packet number (SPN) is a number from the head of the packet in the clip AV stream.

Next, in step S153, the updating process of the play list file and the clip information file is executed based on the data after the reconfiguration process (such as a multiplexing process) of the clip AV stream.

A detailed sequence of the updating process of the play list file and the clip information file will be described with reference to the flow chart shown in FIG. 29.

In step S171, the source packet number (SPN) of the I picture at the head of the GOP is calculated based on the data after the reconfiguration process (such as a multiplexing process) of the clip AV stream.

In step S172, the data processing section records the source packet number (SPN) of the calculated GOP head in the EP map (EP_map).

The process corresponds to, for example, the process described previously with reference to FIG. 24.

Along with changing of the SPN of the head packet of the stream data 00001.m2ts shown in FIG. 24, the registration information of the EP map of the clip information file which corresponds to the stream data 00001.m2ts is changed. That is, a process is performed where the SPN=X, which is the registration information of the EP map which is recorded in the clip information file shown in the center of (b1) of FIG. 24, is rewritten as SPN=N. In this manner, the data processing section of the information processing device of an embodiment of the disclosure executes the updating process of the reproduction control information file where the position information of the packet which corresponds to the angle change point is acquired based on the conversion data which is generated by the data conversion section, and the angle change point position information of the data before conversion, which is recorded in the EP map of the reproduction control information file (clip information file) which is included in the copy target data, is updated with the angle change point position information of the data after conversion. Here, the PTS (presentation time stamp) which is the reproduction time information is the same before conversion and after conversion of the data and does not change.

Here, the process described with reference to FIG. 24 is described as the process example where only the value of the SPN with regard to the angle change point is changed, but there may be a configuration where the values of all of the SPN values registered in the EP map are re-set.

The source packet number (SPN) which is recorded in the EP map, for example, may be calculated by counting the number of packets from the head packet of the configuration data of the clip AV stream after conversion or may be calculated based on the number of bytes from the head of the configuration data of the clip AV stream after conversion. One packet is 192 bytes and it is possible to calculate the number of preceding packets by subtracting the number of bytes from the head of the AV stream file to the angle change point from 192 bytes, and the packet number (SPN) of the angle change point is the number of preceding packets plus one.

By using the EP map updated in this manner, it is possible for the reproduction device which reproduces the copy data after conversion to determine the correct position of the I picture from the updated EP map and it is possible to execute the reproduction process from the SPN position which is registered in the EP map.

In step S173, the play list file and the clip information file are updated so as to correspond to the updating of the stream removed during the conversion (transcoding).

An updating process example of the play list file and the clip information file will be described with reference to FIGS. 30 and 31.

FIG. 30 is a diagram illustrating an updating process example of the play list file.

Figure 31:
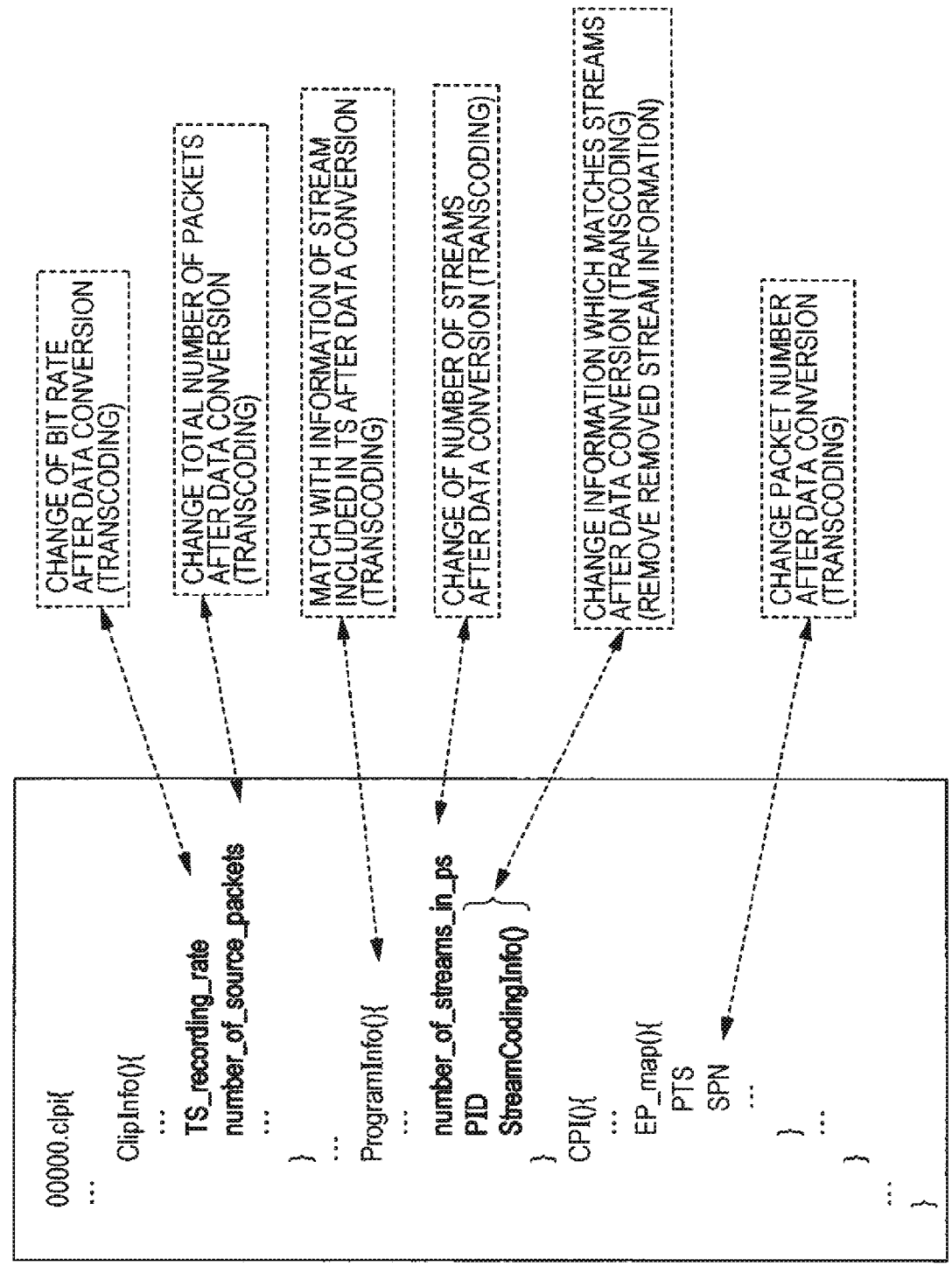
FIG. 31 is a diagram illustrating an updating process example of a clip information file.

FIG. 31 is a diagram illustrating an updating process example of the clip information file.

First, the updating process example of the play list file will be described with reference to FIG. 30.

The example shown in FIG. 30 is an example where the sub path information (SubPath( )) which is set by the play list file is removed. For example, in a configuration where an audio (1) which is a Japanese audio and an audio (2) which is an English audio are set, in a case where the audio (2) which is the English audio is not the copy target and is removed, the sub path, which is used as specification information of the audio stream of the audio (2) which is the English audio, is removed.

In this manner, at a time of the play list file (=play list before updating (1) shown in FIG. 21) which is recorded on the first medium which is the copy original being copied to the second medium, in a case where there is the clip AV stream which corresponds to the removed sub path, the sub path information (Sub Path( )), which is used as the specification information of the removed clip AV stream, is removed.

Due to the removal process, the play list after conversion (2) shown in FIG. 30 is created. The updated play list file is recorded on the second medium as the copy destination.

FIG. 31 is a diagram illustrating an updating process example of the clip information file. The clip information file is a file which records the reproduction information and the like which corresponds to the clip AV stream which is the reproduction target and a process is performed where recording data is changed in accordance with the data removal process and the clip AV stream after the conversion process.

Specifically, data changing as shown in FIG. 31 is performed. That is, TS_recording_rate: changing of the bit rate after the data conversion (transcoding). number_of_source_packets: changing total number of packets after the data conversion (transcoding). ProgramInfo( ): performing of a changing process where there is matching with the stream information which is included in the transport stream (TS) after the data conversion (transcoding). number_of_stream_in_ps: changing of the number of streams after the data conversion (transcoding). PID, StreamCodingInfo( ): changing the information where there is matching of the streams after the data conversion (transcoding). Here, the information of the removed streams is removed. SPN of the EP map: changing the packet number after the data conversion (transcoding).

For example, the updating process of the clip information file which accompanies the changing processes is executed.

Figure 29:
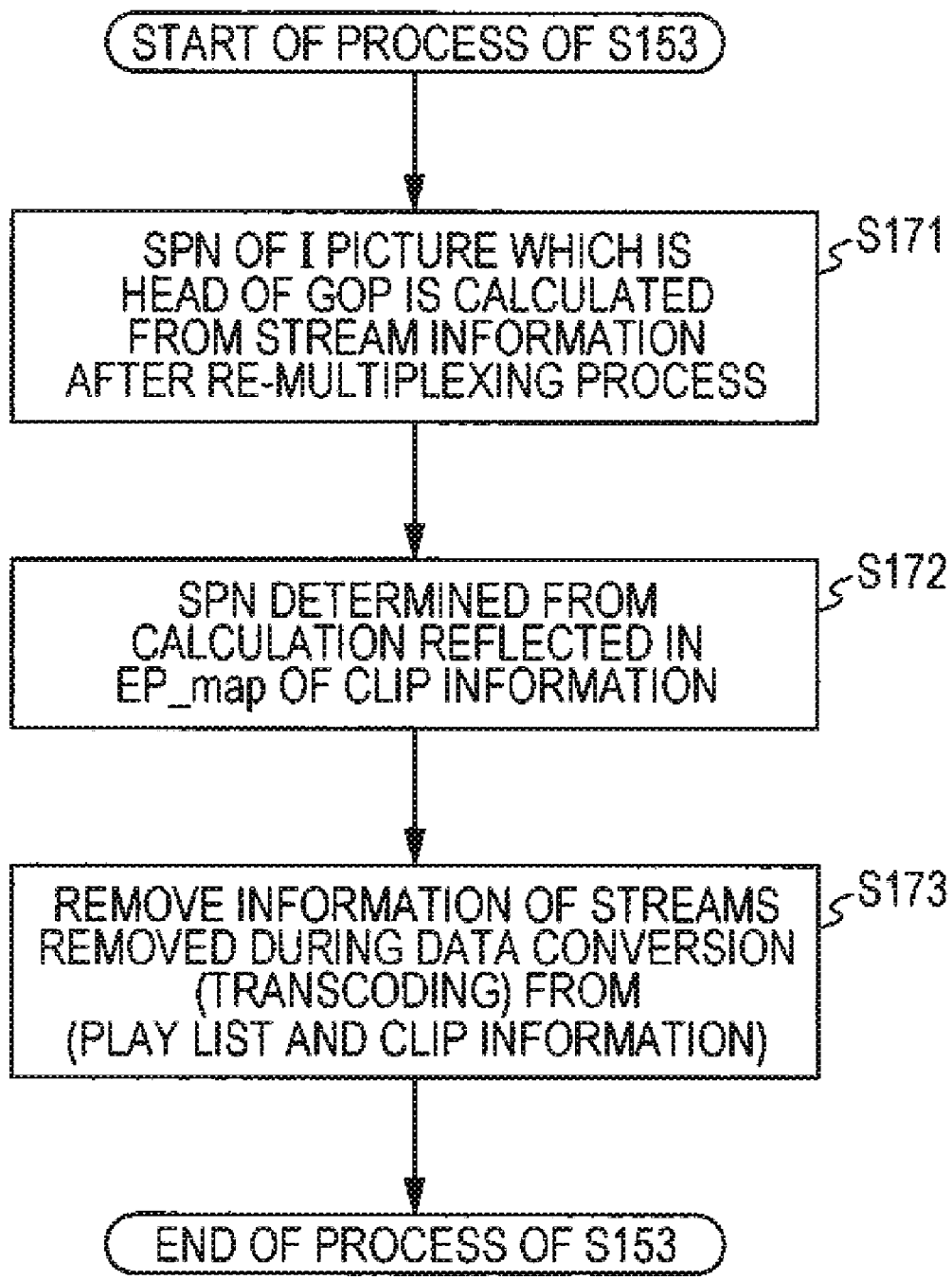
FIG. 29 is a flow chart describing a copying process sequence executed in an information processing device according to an embodiment of the disclosure.

The processes are performed as the process of step S173 of the flow shown in FIG. 29, that is, the updating process of the play list file and the clip information file.

Due to the updating process, the play list file and the clip information file, which match content of the AV stream file which is copied and recorded on the second medium, are created.

Figure 28:
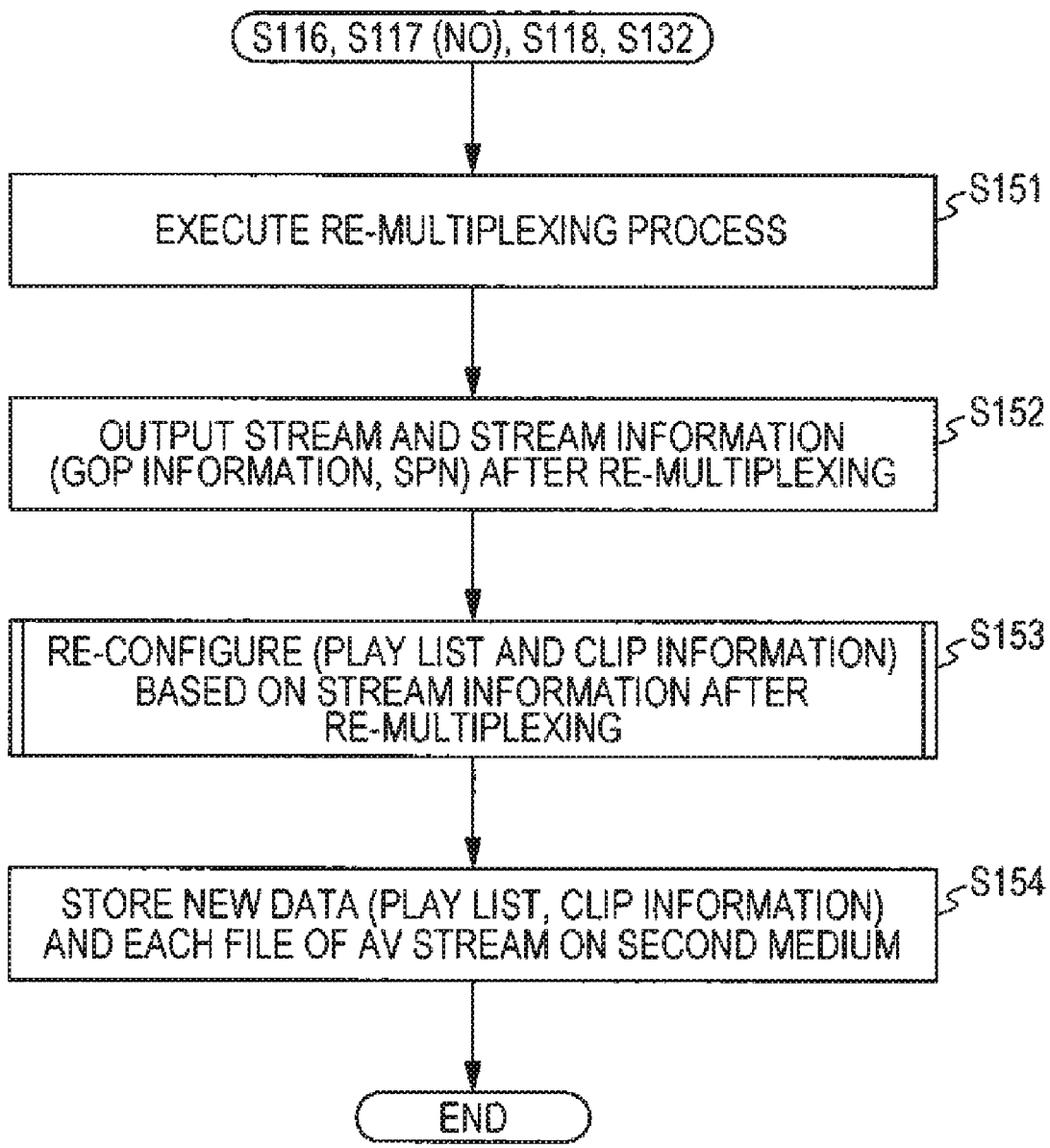
FIG. 28 is a flow chart describing a copying process sequence executed in an information processing device according to an embodiment of the disclosure.

The processes are executed as the process of step S153 shown in FIG. 28, and after the completion of the process, the process of step S154 shown in FIG. 28 is executed.

In step S154, with regard to the second medium which is the copy destination medium, the data of the updated play list file (PlayList), the updated clip information file (ClipInfo), the clip AV stream data where the picture of the angle change point is set as the I picture of the closed GOP or the IDR picture, are recorded.

The data which is recorded on the second medium using the process becomes data which has the form which is different to the data which is recorded on the first medium, but becomes the copy content where it is possible to reliably execute the angle changing process with the same process as the copy original content.

That is, in the registration information of the EP map which is recorded in the clip information file, the PTS/SPN data of the angle change point becomes the correct setting which corresponds to the configuration of the clip AV stream after conversion.

In addition, the head picture of the angle change point in the clip AV stream is set as the head I picture of the closed GOP or the IDR picture and is set as the picture where smooth decryption and production is possible.

7. Configuration Example of Information Processing Device

Figure 32:
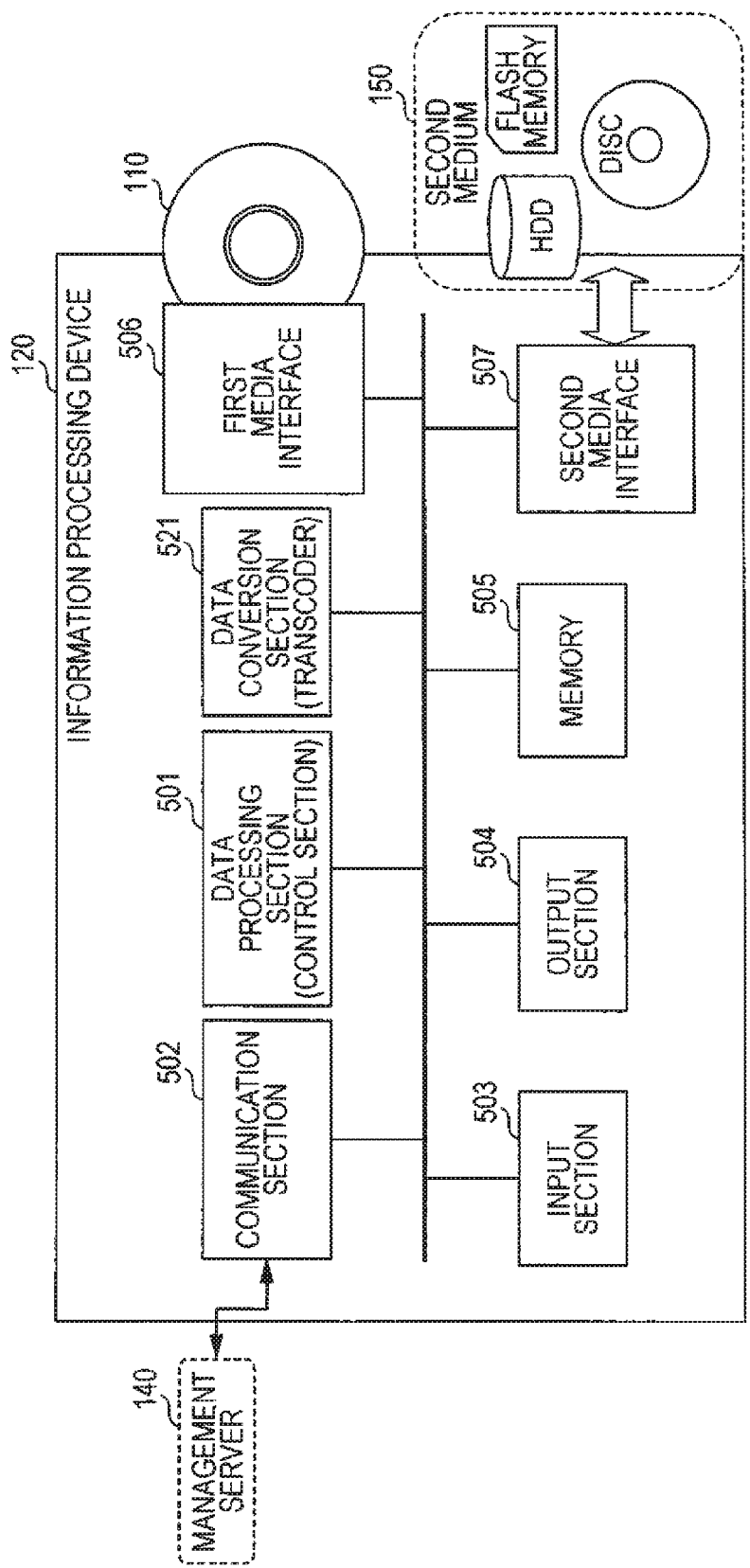
FIG. 32 is a diagram describing a configuration example of an information processing device.

Lastly, a configuration example of an information processing device 120 according to an embodiment of the disclosure will be described with reference to FIG. 32. The information processing device 120 has a configuration, for example, where it is possible to mount the first medium 110 which is a recording medium of the copy original content and the second medium 150 as the copy destination of the content. Here, it is not necessary for it to be possible for two media to necessarily be mounted, and for example, there may be a configuration where the copy destination medium is mounted in another device which is connected via a USB cable, wireless communication, or the like, and the copy data is output.

As the first medium 110 and the second medium 150, it is possible to, for example, use various types of media (information recording media) such as a Blu-ray Disc (registered trademark), a DVD, a hard disk, or a flash memory.

As shown in FIG. 23, the information processing device 120 has a data processing section (control section) 501, a communication section 502, an input section 503, an output section 504, a memory 505, a first media interface 506, a second media interface 507, and a data conversion section (transcoder).

The data processing section 501 is configured by a CPU or the like which has a program execution function which executes various data processing programs. For example, other than the data recording and reproduction processes, various processes, which accompany the copying process in accordance with each of the flow charts described above, are executed. Furthermore, control is performed over all processes which are executed by the device such as the communication process of the management server 140 via the communication section 502.

A data conversion section (transcoder) 521 executes the data conversion process in the copying process.

For example, the conversion process, which accompanies the processes of (1) coding method conversion (conversion between the MPEG-2 and the AVC or the like)

(2) video compression rate conversion (3) stream removal described previously with reference to FIG. 22.

The communication section 502 is used in the communication process with the management server 140, and is used in the requesting of the server response information (Offer Response) described above and performing reception, and further, in the reception process of the copy permitted information (Permission) and the like.

The input section 503 is, for example, a user operating section and various inputs are performed such as the input of a data recording or reproduction instruction and a copy instruction. Here, in the input section 503, a remote control is included and the input of remote control operating information is also possible. The output section 504 is an output section of images or sounds which is configured by a display, a speaker, or the like. The memory 505 is configured by a RAM, a ROM, or the like, is used as a storage region and the like for programs executed in the data processing section 501, various parameters, and received data, and further, is used as a buffer region and the like for copy data.

The first media interface 506 is an interface which is applied to the data recording, reproduction, and copying processes using the first medium 110. The data writing and data reading processes, the copying process, and the like using the first medium 110 are performed in accordance with a request of the data processing section 501.

The second media interface 507 is an interface which is applied to the data recording and reproduction processes and the copying process using the second medium 150. The data writing and data reading processes, the copying process, and the like using the second medium 150 are performed in accordance with a request of the data processing section 501.

Above, the disclosure has been described while referencing specific embodiments. However, it should be understood by those skilled in the art that modifications and alterations of the embodiments are possible within the scope which does not depart from the concept of the disclosure. That is, the disclosure has been disclosed using forms which are exemplifications and should not be interpreted as limiting. In order to determine the scope of the disclosure, the field containing the range of the claims is to be referenced.

In addition, it is possible to execute the series of processes described in the specifications using hardware, software, or a combined configuration of both. In a case where the processes are executed using software, it is possible that a program which records the process sequences is installed in a memory of a computer, which has dedicated hardware built in, and executed, or a program is installed on a general-purpose computer, which is able to execute various types of processes, and is executed. For example, it is possible for a program to be recorded in advance on a recording medium. Other than being installed on a computer from a recording medium, it is possible for a program to be received via a network, such as a LAN (Local Area Network) or the Internet, and installed on a recording medium such as a built-in hard disk or the like.

Here, each type of process which is described in the specifications may not just be executed in a time series in accordance with the description but may be executed in parallel or individually according to the processing capacity of the device which executes the processes or as necessary. In addition, the system in the specifications is a logical composite configuration of a plurality of devices and is not limited to each configuration of the devices being in the same housing.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
   a data processing section which executes control of a copying process where recording data on a first medium is recorded onto a second medium; and
   a data conversion section which executes data conversion in the copying process,
   wherein the data processing section acquires position information of a packet, which corresponds to an angle change point, based on conversion data generated by the data conversion section and executes an updating process on a reproduction control information file where angle change point position information of data before conversion which is recorded in the reproduction control information file included in copy target data is changed to angle change point position information of data after conversion.

2. The information processing device according to claim 1, wherein the data processing section is a configuration where a rewriting process of a source packet number (SPN), which is registration data of an EP map included in a clip information file which is the reproduction control information file, is executed, and executes a process where a source packet number (SPN) which corresponds to the packet position of the angle change point of the data before conversion is changed to a source packet number (SPN) which corresponds to the packet position of the angle change point of the data after conversion.

3. The information processing device according to claim 2, wherein, in regard to correspondence data of a presentation time stamp (PTS) which is reproduction time information registered in the EP map and a source packet number (SPN), the data processing section performs a process where the presentation time stamp (PTS) is not changed and the source packet number (SPN) is changed according to the configuration of the data after conversion.

4. The information processing device according to claim 2, wherein, the data processing section is calculated the source packet number (SPN) which corresponds to the packet position of the angle change point of the data after conversion based on the number of packets or the number of bits from the head of the stream data after conversion.

5. The information processing device according to claim 2, wherein, in regard to correspondence data of a presentation time stamp (PTS) which is reproduction time information registered in the EP map and a source packet number (SPN), the data processing section performs a process where the source packet number (SPN) is changed according to the configuration of the data after conversion irrespective of whether or not it is the angle change point.

6. The information processing device according to claim 1, wherein the data conversion section generates conversion data which is at least able to be decrypted without referencing a preceding picture in a case where a picture which is the reproduction start position of the angle change point is reproduced as a reproduction start point.

7. The information processing device according to claim 1, wherein the data conversion section executes a data conversion process which includes at least a process of any of encoding method conversion, compression rate conversion, and stream removal.

8. The information processing device according to claim 1, further comprising:
a communication section which executes communication with a management server,
wherein the data processing section displays a list of copy permitted data which includes recording data on the first medium based on received information from the management server and selects copy target data based on user designation with regard to display information.

9. An information processing method, which is executed in an information processing device, comprising:
executing control of a copying process where recording data on a first medium is recorded onto a second medium using a data processing section; and
executing data conversion in the copying process using a data conversion section,
wherein, in the executing of control of the copying process, position information of a packet which corresponds to an angle change point is acquired based on conversion data generated by the data conversion section and an updating process on a reproduction control information file, where angle change point position information of data before conversion which is recorded in the reproduction control information file included in copy target data is changed to angle change point position information of data after conversion, is executed.

10. A program, which executes information processing in an information processing device, comprising:
executing control of a copying process where recording data on a first medium is recorded onto a second medium using a data processing section; and
executing data conversion in the copying process using a data conversion section,
wherein, in the executing of control of the copying process, position information of a packet which corresponds to an angle change point is acquired based on conversion data generated by the data conversion section and an updating process on a reproduction control information file, where angle change point position information of data before conversion which is recorded in the reproduction control information file included in copy target data is changed to angle change point position information of data after conversion, is executed.

* * * * *